US012100085B2

(12) United States Patent
Takakuwa et al.

(10) Patent No.: US 12,100,085 B2
(45) Date of Patent: Sep. 24, 2024

(54) INFORMATION PROCESSING SYSTEM, INFORMATION PROCESSING METHOD AND NON-TRANSITORY COMPUTER READABLE MEDIUM STORING PROGRAM

(71) Applicant: GREE, Inc., Tokyo (JP)

(72) Inventors: Soichiro Takakuwa, Tokyo (JP); Kazunori Yamamoto, Kanagawa (JP); Tomoki Morita, Tokyo (JP)

(73) Assignee: GREE, INC., Tokyo (JP)

( * ) Notice: Subject to any disclaimer, the term of this patent is extended or adjusted under 35 U.S.C. 154(b) by 126 days.

(21) Appl. No.: 17/896,101

(22) Filed: Aug. 26, 2022

(65) Prior Publication Data
US 2023/0065048 A1    Mar. 2, 2023

(30) Foreign Application Priority Data
Aug. 28, 2021 (JP) ................. 2021-139472
Feb. 24, 2022 (JP) ................. 2022-026443

(51) Int. Cl.
*G06T 13/40* (2011.01)
*A63F 13/56* (2014.01)
(Continued)

(52) U.S. Cl.
CPC .............. *G06T 13/40* (2013.01); *A63F 13/56* (2014.09); *G06T 13/80* (2013.01); *G06F 3/012* (2013.01);
(Continued)

(58) Field of Classification Search
CPC ......... G06T 13/40; G06T 11/60; G06T 13/80; G06T 13/00; G06T 19/20;
(Continued)

(56) References Cited

U.S. PATENT DOCUMENTS

2019/0349636 A1* 11/2019 Watanabe .............. G06V 40/23
2022/0241692 A1*  8/2022 Fukushige ............ A63F 13/215

FOREIGN PATENT DOCUMENTS

JP    2015-184689 A    10/2015
JP     2021-2824 A     1/2021

OTHER PUBLICATIONS

Notice of Reasons for Refusal mailed on Sep. 11, 2021, received for JP Application 2021-139472, 6 pages Including English Translation.
(Continued)

Primary Examiner — Hau H Nguyen
(74) Attorney, Agent, or Firm — XSENSUS LLP

(57) ABSTRACT

An information processing system includes an information processing device, a stream user terminal and viewing user terminal. The information processing device comprises processing circuitry configured to stream a video, including a character object of a stream user, to the viewing user terminal by transmitting information on the video to the viewing user terminal; aggregate resulting information including information on an action by a viewing user to the video during streaming of the video; determine a specific motion to be applied to the character object based on the resulting information; and transmit specific information on the specific motion to the stream user terminal. After the streaming of the video is ended, a resulting screen is displayed on the stream user terminal, the resulting screen including a character image with the specific motion applied to the character object, and the character image is generated based on the specific information.

20 Claims, 34 Drawing Sheets

(51) Int. Cl.
*G06T 13/80* (2011.01)
*G06F 3/01* (2006.01)
*G06F 3/0346* (2013.01)
*H04L 65/1066* (2022.01)

(52) U.S. Cl.
CPC ........ *G06F 3/0346* (2013.01); *G06T 2200/24* (2013.01); *H04L 65/1066* (2013.01)

(58) Field of Classification Search
CPC ........... G06T 2207/30201; G06F 3/011; G06F 3/013; G06F 3/0484; G06F 16/78; G06F 16/7867; H04N 21/4788; H04N 21/4784; H04N 21/2743
See application file for complete search history.

(56) References Cited

OTHER PUBLICATIONS

Decision of Refusal mailed on Feb. 18, 2021, received for JP Application 2021-139472, 6 pages including English Translation.

\* cited by examiner

FIG. 12

| FREE | ACCESSORIES | SUPPORT GOODS | APPEAL | VARIETY |

| CANDY (WHITE) 30 PT | CANDY (RED) 30 PT | CANDY (YELLOW) 30 PT | CANDY (BLUE) 30 PT |
| FAVOSTAMP 5 PT | STAR STAMP 1 PT | FIREWORKS (SMALL) 10 PT | FIREWORKS (MEDIUM) 20 PT |
| EMOI 100 PT | IKEBO 100 PT | MUSIC NOTE STAMP 10 PT | RAINBOW 150 PT |

MY POINT  5,855 PT

FIG. 23

| TYPE | THE NUMBER OF LIKES | POSING |
|---|---|---|
| F | 50,000 OR MORE | Po0060_F001_POSE A |
| | 1,000 TO 49,999 | Po0035_F001_POSE B |
| | 200 TO 999 | Po0049_F001_POSE C |
| | 50 TO 199 | Po0053_F001_POSE D |
| | 0 TO 49 | Po0006_F001_POSE E |
| M | 50,000 OR MORE | Po0050_M001_POSE A |
| | 1,000 TO 49,999 | Po0060_M001_POSE B |
| | 200 TO 999 | Po0054_M001_POSE C |
| | 50 TO 199 | Po0059_M001_POSE D |
| | 0 TO 49 | Po0010_M001_POSE E |

INFORMATION PROCESSING SYSTEM, INFORMATION PROCESSING METHOD AND NON-TRANSITORY COMPUTER READABLE MEDIUM STORING PROGRAM

CROSS-REFERENCE TO RELATED APPLICATIONS

The present application claims priority to JP 2021-139472, filed in Japan on Aug. 28, 2021, and to JP 2022-026443, filed in Japan on Feb. 24, 2022, and the entire contents of both is hereby incorporated by reference.

BACKGROUND

Conventionally, an information processing system generates an animation of a character object based on motion of an actor, and streams a video including the animation of the character object.

SUMMARY

In an exemplary implementation of the present disclosure, an information processing device is included in an information processing system including the information processing device, a stream user terminal and a viewing user terminal. The information processing device comprises processing circuitry configured to stream a video, including a character object of a stream user, to the viewing user terminal by transmitting information on the video to the viewing user terminal; aggregate resulting information including information on an action by a viewing user to the video during streaming of the video; determine a specific motion to be applied to the character object based on the resulting information; and transmit specific information on the specific motion to the stream user terminal. After the streaming of the video is ended, a resulting screen is displayed on the stream user terminal, the resulting screen includes a character image with the specific motion applied to the character object, and the character image is generated based on the specific information.

BRIEF DESCRIPTION OF THE DRAWINGS

FIG. 12 is a conceptual illustration of an image of a screen displayed on a user terminal;

FIG. 23 is a data configuration table showing a data configuration in which each of motions is associated with a number of posted evaluations;

DETAILED DESCRIPTION

Figure 1:
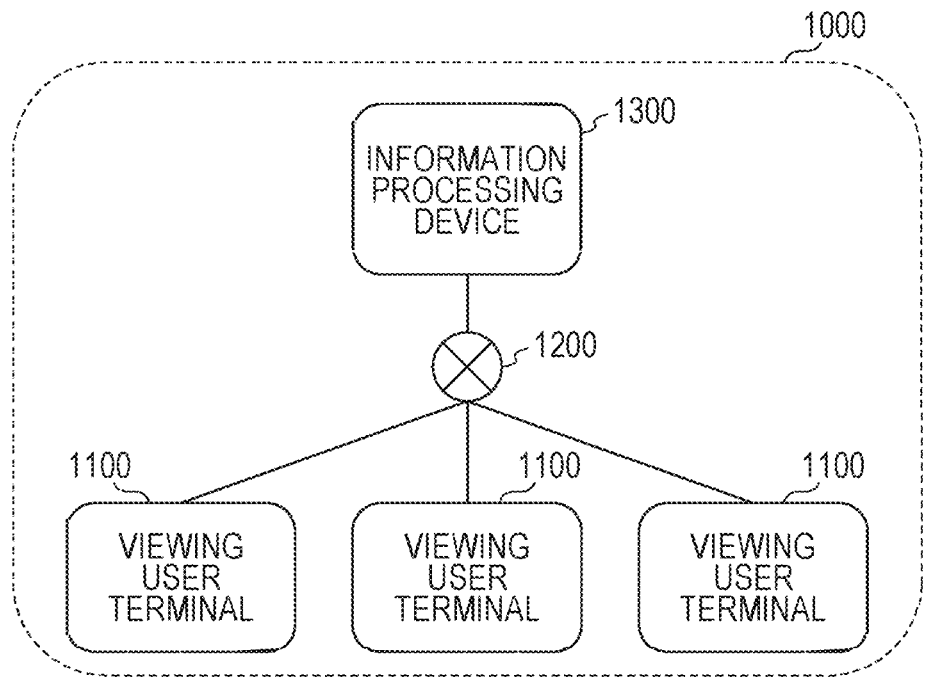
FIG. 1 is a system configuration diagram showing an exemplary information processing system in the present disclosure.

The inventors of the present disclosure have recognized that an important challenge is to find how motivation of a stream user for streaming and/or motivation of a viewing user for viewing should be increased. The inventors have developed the technology of the present disclosure to provide technical improvement by which at least part of the above-mentioned problem in the related art can be coped with or relieved. It is a more specific object of the present disclosure to provide an information processing system, an information processing method and a non-transitory computer readable medium storing a program that are capable of increasing motivation of a stream user for streaming and/or motivation of a viewing user for viewing.

An information processing system in the present disclosure provides an information processing system including a stream user terminal, a viewing user terminal and an information processing device, the information processing system comprising one or a plurality of computer processors, the one or the plurality of computer processors including: a stream unit that streams a video including a character object of a stream user to the viewing user terminal by transmitting information on the video to the viewing user terminal; an aggregate unit that aggregates resulting information including information on an action by a viewing user to the video during streaming of the video; a determination unit that determines a specific motion to be applied to the character object based on the resulting information aggregated by the aggregate unit; and a transmission unit that transmits information on the specific motion determined by the determination unit to the stream user terminal. After end of streaming of the video, a resulting screen is displayed on the stream user terminal, the resulting screen including a character image with the specific motion applied to the character object, the character image being generated based on the information on the specific motion, transmitted from the transmission unit.

The action by the viewing user to the video provides one or more display requests for a gift, one or more posted comments, and/or one or more posted evaluations to the video by the viewing user, and the aggregate unit can aggregate the number of the one or more display requests, the number of the one or more posted comments and/or the number of the one or more posted evaluations to obtain the resulting information.

The transmission unit further transmits the resulting information aggregated by the aggregate unit to the stream user terminal, and the resulting information further can be displayed on the resulting screen.

Information on a stream time of the video, information on a score related to streaming of the video, information on the number of one or more posted evaluations to the video, information on the number of one or more posted comments to the video, information on a number of users associated with the stream user, and/or information on the number of viewers of the video are displayed on the resulting screen.

A viewing user list in which viewing users of the video are arranged in a predetermined order can be further displayed on the resulting screen.

On the viewing user list, a gift image can be displayed along with the number of one or more display requests for a gift, the gift image indicating the gift for which the viewing user has made the one or more display requests during viewing of the video.

When the viewing user has made a display request for multiple gifts each of which is the gift during viewing of the video, gift images, each of which is the gift image, can be arranged and displayed in a specific order.

A specific gift selected from the gift or gifts for which the viewing user has made a display request can be displayed along with the character image on the resulting screen.

A share icon which allows the character image to be shared by the viewing user or other users can be displayed on the resulting screen.

A share icon which allows the character image to be shared by a viewing user who has made a display request for the specific gift can be displayed on the resulting screen.

The aggregate unit further aggregates resulting information including information on an action by the stream user to the video during streaming of the video, and the determination unit determines a specific motion to be applied to the character object based on the resulting information including the information on the action by the viewing user to the video and the information on the action by the stream user to the video which are aggregated by the aggregate unit.

The action by the stream user to the video is streaming of the video by the stream user, and the aggregate unit aggregates a stream time of the video provided by the stream user, and can include the aggregated stream time in the resulting information.

The aggregate unit can aggregate the information in response to a stream end request for the video, transmitted from the stream user terminal.

The determination unit can determine a motion associated with a classification corresponding to resulting information as a specific motion to be applied to the character object of the stream user, the resulting information being aggregated by the aggregate unit.

The character object to which the specific motion is applied can be a character object in a display mode included in the video immediately before a stream end request for the video is transmitted from the stream user terminal.

A confirmation screen regarding the display mode of the character object can be displayed on the stream user terminal before a stream end request for the video is transmitted.

An information processing method in the present disclosure provides an information processing method in an information processing system including one or a plurality of computer processors, the information processing method causing the one or the plurality of computer processors to execute: streaming a video including a character object of a stream user to the viewing user terminal by transmitting information on the video to the viewing user terminal; aggregating resulting information including information on an action by a viewing user to the video during streaming of the video; determining a specific motion to be applied to the character object based on the resulting information aggregated in the aggregating; and transmitting information on the specific motion determined in the determining to the stream user terminal. After end of streaming of the video, a resulting screen is displayed on the stream user terminal, the resulting screen including a character image with the specific motion applied to the character object, the character image being generated based on the information on the specific motion, transmitted in the transmitting.

An information processing method in the present disclosure provides an information processing method in a stream user terminal including one or a plurality of computer processors, the information processing method causing the one or the plurality of computer processors to execute: transmitting information on a video including a character object of a stream user; receiving information on a specific motion to be applied to the character object determined based on resulting information including information on an action by a viewing user to the video; generating a resulting screen based on the information on the specific motion received in the receiving after end of streaming of the video, the resulting screen including a character image with the specific motion applied to the character object; and displaying the resulting screen.

A non-transitory computer readable medium storing a program in the present disclosure provides a non-transitory computer readable medium storing a program to be executed in a stream user terminal including one or a plurality of computer processors, the program causing the one or the plurality of computer processors to execute: a transmission function of transmitting information on a video including a character object of a stream user; a reception function of receiving information on a specific motion to be applied to the character object determined based on resulting information including information on an action by a viewing user to the video; a generation function of generating a resulting screen based on the information on the specific motion received by the reception function after end of streaming of the video, the resulting screen including a character image with the specific motion applied to the character object; and a display function of displaying the resulting screen.

According to the present disclosure, it is possible to provide technical improvement by which at least part of the above-mentioned problem in the related art can be coped with or relieved. Specifically, according to the present disclosure, motivation of a stream user for streaming and/or motivation of a viewing user for viewing can be increased.

First, an overview of an information processing system according to an embodiment of the present disclosure will be described with reference to the drawings.

The information processing system in the present disclosure is an information processing system that streams videos, and includes one or a plurality of computer processors. A description will be given assuming that each of the streamed videos includes an animation of a character object generated based on an action of a stream user; however, without being limited to this, a character object generated based on an action of a stream user may not appear in some streamed videos. In the streamed video, for example, a stream user himself/herself may appear, or the voice and predetermined images of a stream user may be replayed as in a karaoke video and a game live broadcast video. Alternatively, as described below, in the video, a character object may be superimposed and displayed on a game screen and/or an image captured in a real space.

<System Configuration>

As shown as an example in FIG. 1, an information processing system 1000 according to the present disclosure may include one or more viewing user terminals 1100, and an information processing device (support computer) 1300 which is installed in a video streaming studio or the like and connected to the viewing user terminals 1100 via a network 1200.

Alternatively, the information processing device 1300 may be connected to a server apparatus 1400 via the Internet, and the server apparatus 1400 may perform part or all of the processing to be executed by the information processing device 1300. Note that such a server apparatus 1400 may be an information processing device 2400 shown in FIG. 2.

In the present description, streaming by the information processing system 1000 is called studio streaming.

In the studio streaming, a marker attached to a stream user is captured by a camera provided in the studio, and an action of the whole body of the stream user (actor) is reflected on a character in real time using a known motion capture technology.

Figure 2:
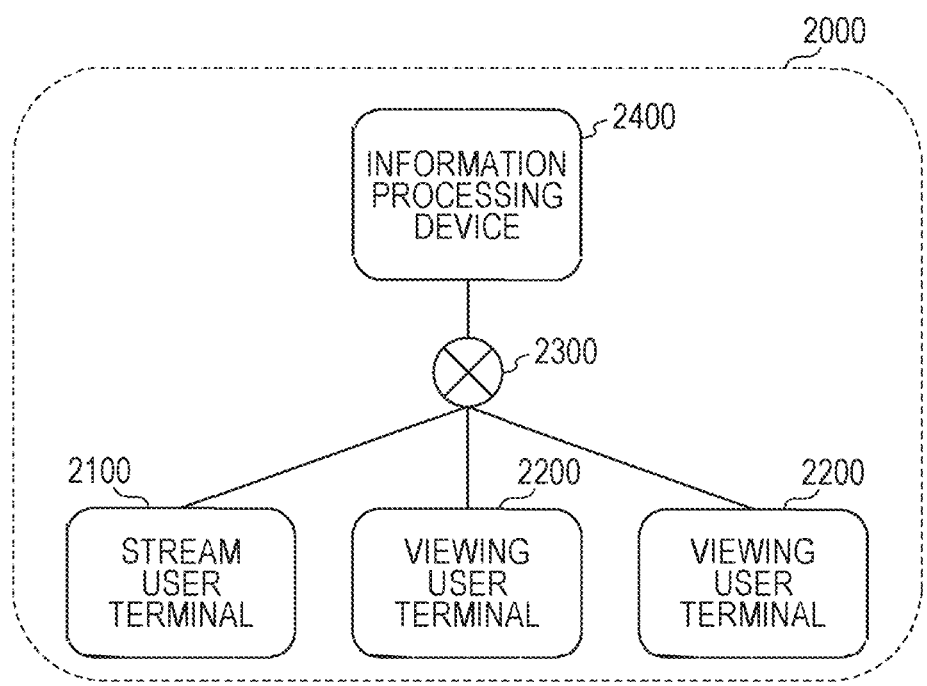
FIG. 2 is a system configuration diagram showing another exemplary information processing system in the present disclosure.

In addition, the information processing system 1000 of the present disclosure can cooperate with another information processing system 2000 shown as an example in FIG. 2. The information processing system 2000 shown in FIG. 2 may include a stream user terminal 2100, one or more viewing user terminals 2200, and an information processing device (server apparatus) 2400 connected to the stream user terminal 2100 and the one or more viewing user terminals 2200 via a network 2300.

In the example described above, the stream user terminal 2100 may be an information processing terminal such as a smartphone. In the present description, streaming by the information processing system 2000 is called mobile streaming.

In the mobile streaming, the face of a stream user is captured by a camera provided in the stream user terminal 2100, and movement of the face of the stream user is reflected on the face of a character in real time using a known face tracking technology.

As an example, videos generated by the information processing system 1000 and the information processing system 2000 can be streamed from one video streaming platform to viewing users.

In either streaming, a process of generating an animation by reflecting motion on a character, and a process of displaying the gift described later may be shared and performed by a stream user terminal, a viewing user terminal, an information processing device and other devices.

Specifically, face motion data and voice data of a stream user are transmitted from the stream user terminal to a terminal or a device which generates an animation of a character object. Alternatively, a body motion may be transmitted in addition to the face motion.

In the description below, a process of generating an animation is assumed to be performed by each of the stream user terminal and the viewing user terminals, but this is not always the case.

In the description below, the information processing system in the present disclosure is assumed to include the system configuration (mobile streaming) shown in FIG. 2, however, the information processing system may include the system configuration shown in FIG. 1.

Note that a stream user and a viewing user in the mobile streaming are not particularly distinguished, and a viewing user can perform mobile streaming anytime, and a stream user can be a viewing user when the stream user views a video of another stream user.

As described above, each video streamed by the information processing system in the present disclosure may be a game screen played by a stream user and/or an image captured in a real space. In this case, a character object generated based on the action of a stream user, or a real image of a stream user may be displayed along with the game screen. When a stream user is contained in an image captured in a real space, the character object generated based on the action of the stream user may be overlaid and displayed on a real image of the stream user (augmented reality (AR)). Alternatively, an animation of a gift object or the like may be overlaid and displayed on an image captured in a real space.

In the present disclosure, the stream user terminal and the viewing user terminals may be a smartphone (multi-functional phone terminal), a tablet terminal, a personal computer, a console game machine, a head mount display (HMD), a wearable computer such as a glasses-type wearable terminal (such as AR glasses), and an information processing device other than these devices, which is capable of replaying a video. In addition, these terminals may be standalone devices which operate independently or may be comprised of multiple devices which are connected to each other to allow various types of data to be transmitted and received.

<Hardware Configuration>

The hardware configuration of the information processing device 2400 included in the information processing system 2000 will be described with reference to FIG. 3. The information processing device 2400 includes a processor 401, a memory 402, a storage 403, an input and output interface (input and output I/F) 404, and a communication interface (communication I/F) 405. These components are connected to each other via a bus B.

The information processing device 2400 can implement the function and the method described in this embodiment by cooperation between the processor 401, the memory 402, the storage 403, the input and output I/F 404, and the communication I/F 405.

The processor 401 executes the function and/or the method to be implemented, by the codes or commands included in programs stored in the storage 403. The processor 401 includes, for example, a central processing unit (CPU), a micro processing unit (MPU), a graphics processing unit (GPU), a microprocessor, a processor core, a multiprocessor, an application-specific integrated circuit (ASIC), and a field programmable gate array (FPGA), and may implement the processes disclosed in the embodiments by a logic circuit (hardware) or a dedicated circuit formed in an integrated circuit (an integrated circuit (IC) chip, a large scale integration (LSI) chip). These circuits may be implemented by one or a plurality of integrated circuits and/or processing circuitry. A plurality of processes shown in each embodiment may be implemented by one integrated circuit. LSI may be called VLSI, super LSI, or ultra LSI depending on the difference in degree of integration.

The memory 402 temporarily stores a program loaded from the storage 403, and provides a working area for the processor 401. The memory 402 also temporarily stores various types of data generated during execution of a program by the processor 401. The memory 402 includes, for example, a random access memory (RAM), and a read only memory (ROM).

The storage 403 stores programs. The storage 403 includes, for example, a hard disk drive (HDD), a solid state drive (SSD), and a flash memory.

The communication I/F 405 is implemented as hardware such as a network adapter, communication software, and a combination of these, and transmits and receives various types of data via a network 300. The communication may be performed by wire or wireless, and any communication protocol may be used provided that mutual communication can be performed. The communication I/F 405 performs communication with another information processing device via the network 300. The communication I/F 405 transmits various types of data to another information processing device in accordance with instructions from the processor 401. The communication I/F 405 also receives various types of data transmitted from another information processing device, and conveys the data to the processor 401.

The input and output I/F 404 includes an input device that receives various operations for the information processing device 2400, and an output device that outputs a result of processing performed by the information processing device 2400. The input device and the output device may be integrated or separated in the input and output I/F 404.

The input device is implemented by one or combinations of all types of devices capable of receiving an input from a user and conveying information on the input to the processor 401. The input device includes, for example, a touch panel, a touch display, a hardware key such as a keyboard, a pointing device such as a mouse, a camera (operation input via an image), and a microphone (operation input by voice).

The input device can include a sensor unit. The sensor unit refers to one or more sensors that detect face motion indicating a change in the expression of a user, and body motion indicating a change in relative position of the body of a user with respect to the sensor unit. The face motion includes a motion such as blinking, and opening and closing of a mouth. A publicly known sensor can be used as the sensor unit. Examples of the sensor unit include a ToF sensor that measures and detects a time of flight taken for light emitted toward a user to be returned after being reflected on the face of a user, a camera that captures the face of a user, and an image processor that processes data captured by the camera. In addition, the sensor unit may include an RGB camera that captures visible light, and a near-infrared light camera that captures near-infrared light. It is possible to use, as the RGB camera and the near-infrared light camera, for example, TrueDepth camera of "iphoneX" (registered trademark), "LIDER" of "iPadPro" (registered trademark), or another ToF sensor mounted on a smartphone. Specifically, each of these cameras projects tens of thousands of invisible dots (points) on the face or the like of a user by a dot projector. The camera detects and analyzes reflected light of a dot pattern to form a depth map of the face, and captures an infrared image of the face or the like, thereby capturing accurate face data. An arithmetic processor of the sensor unit generates various types of information based on the depth map and the infrared image, compares the information with registered reference data, and calculates the depth (the distance between each point and the near-infrared light camera) of each point of the face, and the displacement of position other than the depth.

In addition, the sensor unit may have a function of tracking the hands (hand tracking) as well as the face of a user. The sensor unit may further include an acceleration sensor and/or a gyro sensor other than the above-mentioned sensor. The sensor unit may have a space mapping function of mapping an object onto a spatial map after recognizing the object based on results of detection by the above-mentioned ToF sensors and/or publicly known other sensors. Hereinafter, face motion detection data and body motion detection data are simply referred to as "tracking data" when a description is given without particularly distinguishing these data. Note that the image processor of the sensor unit may include a controller which can be included in the information processing system of the present disclosure.

An operational unit according to the type of a user terminal may be used as the input device. Examples of operational unit include a touch panel integrated with a display, an operation button, a keyboard, a mouse provided in a housing of a user terminal, and a controller manually operated by a user. The controller may incorporate publicly known various types of sensors, such as an inertial measurement unit (IMU) like an acceleration sensor, and a gyroscope. Another example of operational unit may be a tracking device that identifies the motion of the hands of a user, the motion of eyes, the motion of the head, the direction of line of sight and the like. In this aspect, for example, based on the motion of the hands of a user, it is possible to determine instructions of the user, start or stop streaming of a video, and execute various types of operations such as evaluation of a message and a video, a request to display a predetermined object (for example, the gift described below). Note that the operational unit may be omitted when the sensor unit also has an input interface function such as a hand tracking function.

The output device outputs results of processing performed by the processor 401. The output device includes, for example, a touch panel, and a speaker.

Figure 3:
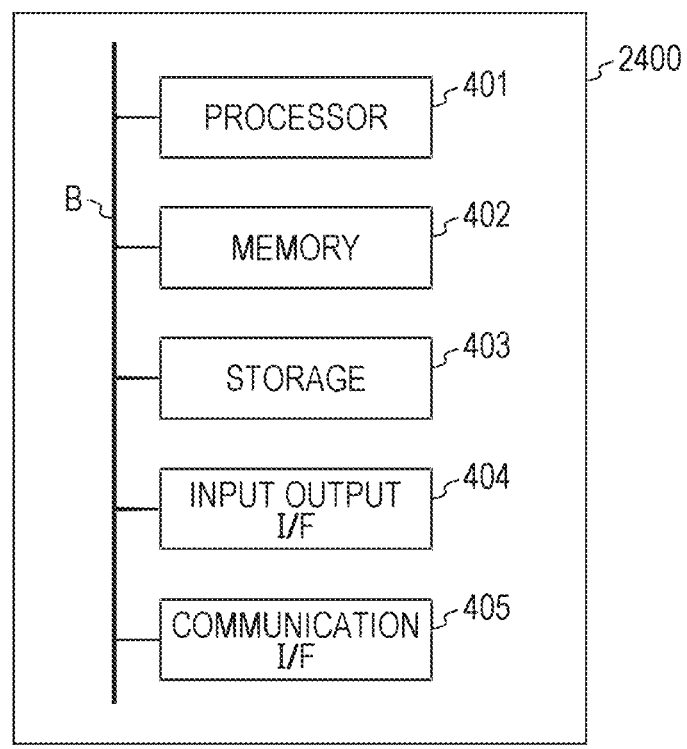
FIG. 3 is a configuration diagram illustrating an exemplary hardware configuration of an information processing device in the present disclosure.

The stream user terminal 2100 and the viewing user terminals 2200 in the present disclosure may each include a hardware configuration as that illustrated in FIG. 3 and described in the corresponding discussion unless otherwise mentioned particularly.

Next, various functions executable and the transition of screens displayed on a user terminal in which an application implemented by the information processing system in the present disclosure is started will be described with reference to the drawings.

Figure 4:
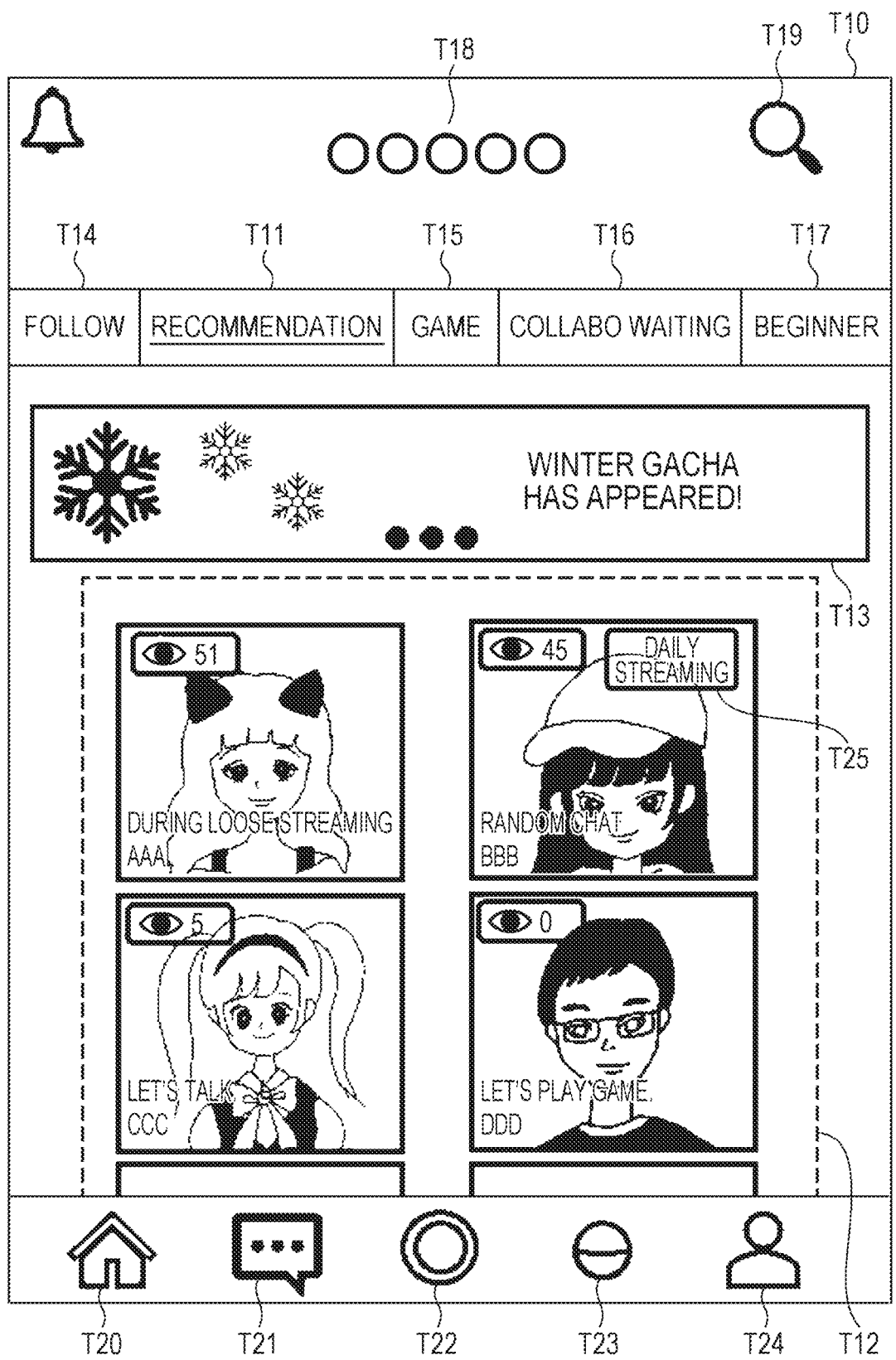
FIG. 4 is a conceptual illustration of an image of a screen displayed on a user terminal.

FIG. 4 shows top screen T10 which is displayed on a user terminal when a video streaming and viewing application is started.

As shown in FIG. 4, a user can view the video replayed on one stream channel by selecting the one stream channel (stream frame, stream program, stream video) from thumbnail images for one or more recommended stream channels T12 listed as recommendation tab T11 on the top screen T10.

Alternatively, a user can view a video replayed on one specific stream channel by accessing a fixed link of the one specific stream channel. Such a fixed link can be obtained through a notice from a stream user being followed or a notification of sharing sent from another user.

In this manner, a user who views a video becomes a viewing user, and a terminal for viewing a video is regarded as a viewing user terminal 2200.

As shown in FIG. 4, display column T13 for notice of a campaign and an event may be displayed on the top screen T10. The display column T13 for notice can be switched to another display for notice by a sliding operation.

In the top screen T10, a follow tab T14, a game tab T15 to display game categories, a collaboration waiting tab T16 to display stream channels for collaboration waiting, and a beginner tab T17 to display stream channels of beginners are displayed. Selecting one of these tabs (switching between tabs) makes transition from the top screen T10 to another screen.

Note that a service name display T18 and a search button T19 in the upper frame of the top screen T10 may remain to be fixed and displayed on the transition screen.

Similarly, a home button T20, a message button T21, a stream preparation button T22, a gacha button T23, and a profile button T24 in the lower frame of the top screen T10 may remain to be fixed and displayed on the transition screen.

In the top screen T10 and the like shown in FIG. 4, a user who selects one of the displayed thumbnail images T12 can be a viewing user who views a video, and a user who selects the stream preparation button T22 can be a stream user who streams an avatar video.

Figure 5:
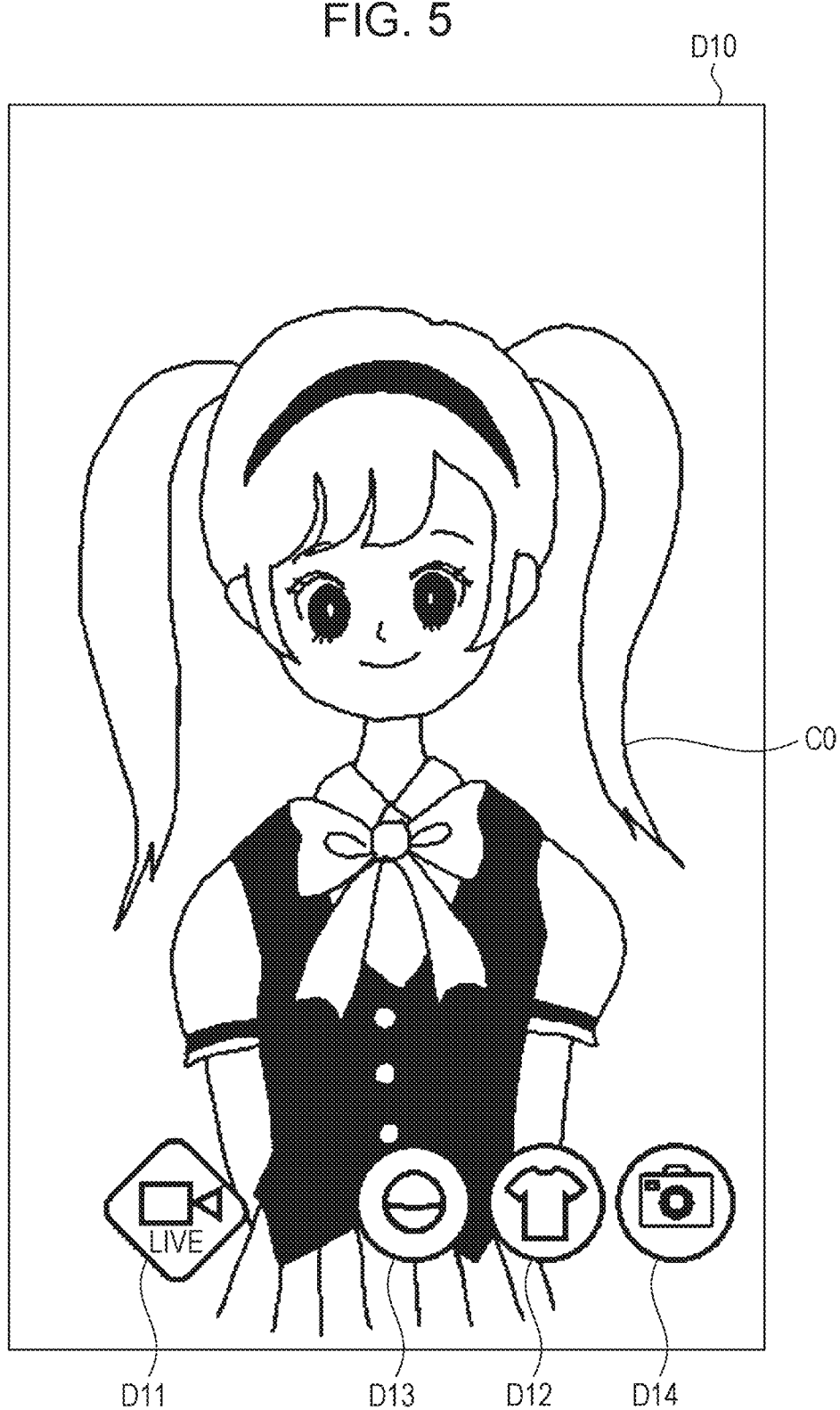
FIG. 5 is a conceptual illustration of an image of a screen displayed on a user terminal.

As an example, when the stream preparation button T22 is selected in the top screen T10 shown in FIG. 4, transition is made to an avatar setting screen D10 shown in FIG. 5. When a stream button D11 is selected in the avatar setting screen D10, transition is made to a stream setting screen D20 shown in FIG. 6. When a stream start button D25 is selected in the stream setting screen D20, transition is made to an avatar stream screen D30 shown in FIG. 7.

Subsequently, the details of the flow until streaming of a video is started will be described.

One or a plurality of computer processors in the present disclosure may include a stream start request reception unit, a stream setting unit, and a stream start unit.

The stream start request reception unit receives a stream start request for a first video including an animation of a character object from the stream user terminal of a stream user.

Here, the first video refers to a video including an animation of a character object. Note that in the present specification, a character object may be referred to as an "avatar".

The stream start request can be transmitted from a user terminal to the information processing device 2400 by selecting a stream button arranged on an avatar setting screen transitioned from the above-described top screen displayed on the user terminal (later, becomes a stream user terminal 2100) in which a dedicated application (video streaming and viewing application) to access the above-mentioned video stream platform is started.

FIG. 5 shows an example of the avatar setting screen D10. On the avatar setting screen D10, a character object CO, a stream button D11, a gacha button D12, a change of clothes button D13, and a photo button D14 can be displayed.

When the change of clothes button D13 is selected by a user, a closet screen is extended for selecting various avatar parts such as eyes, nose, mouth, hair, accessories, clothes, background of the character object CO.

When the gacha button D12 is selected by a user, a drawing screen to obtain the avatar parts is extended.

When the photo button D14 is selected by a user, an image capture screen to capture a still image of the character object is extended.

When the stream button D11 is selected by a user, a stream start request is transmitted to the information processing device 2400.

The stream setting unit sets stream setting for the first video based on the designation from the stream user terminal 2100 in response to the stream start request for the first video received by the stream start request reception unit.

Figure 6:
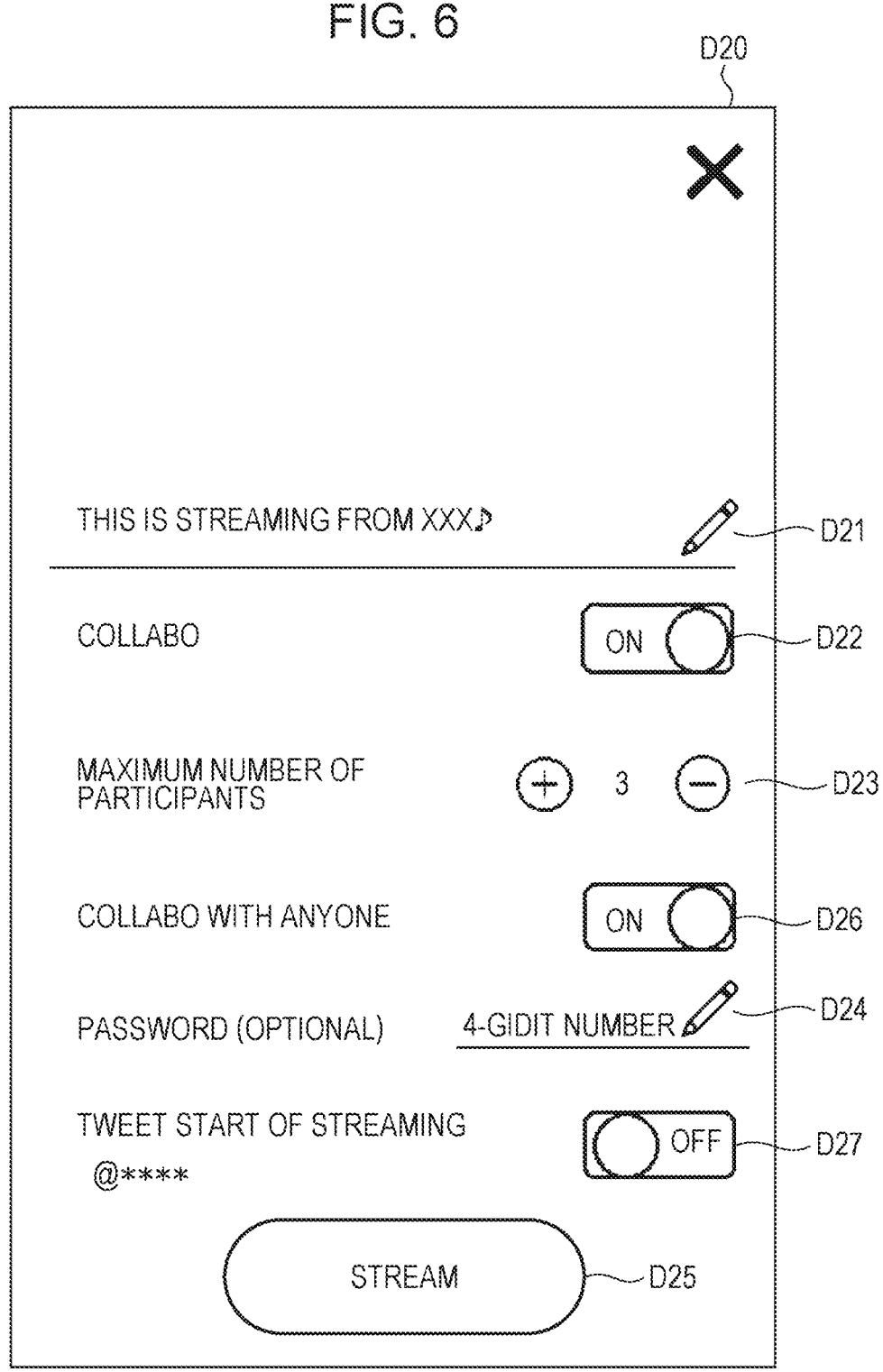
FIG. 6 is a conceptual illustration of an image of a screen displayed on a user terminal.

As an example, when the stream button D11 is selected, the screen displayed on the stream user terminal 2100 transits from the avatar setting screen D10 shown in FIG. 5 to the stream setting screen D20 shown in FIG. 6.

The stream setting may include at least one of setting regarding the title of the first video, setting regarding whether appearance of other users in the first video is permitted, setting regarding the number of persons permitted to appear in the first video, and setting regarding password.

These stream settings can be respectively set in a title setting column D21, a collaboration permission setting column D22, a number of persons setting column D23, and a password setting column D24 in FIG. 6. In FIG. 6, a collaboration with anyone permission setting column D26, and a SNS posting permission column D27 are further displayed.

The title of the first video can be freely determined by a stream user in a range of an acceptable upper limit of characters. When there is no input by a stream user, a predetermined title, such as "This is streaming by XXX", including the stream user or the name of a character object may be automatically determined.

Whether appearance of other users in the first video is permitted can be freely determined by a stream user. When appearance of other users is permitted, other users can apply for appearance to the stream user, and when appearance of other users is not permitted, other users cannot apply for appearance to the stream user. A state where other users appear in a video of a stream user may be referred to as "collaboration" in the present specification. The details of collaboration will be described later.

The number of persons permitted to appear in the first video can be set only when appearance of other users in the first video is permitted, and can be freely determined by a stream user in a range of an acceptable upper limit of persons.

The password can be arbitrarily set only when appearance of other users in the first video is permitted, and a number with a specified number of digits can be freely determined by a stream user. When other users apply for appearance in the first video, such a password is required to be input. A configuration may be adopted in which only when the collaboration with anyone permission setting column D26 is OFF, the password setting column D24 is active.

The stream start unit streams information on the first video to the viewing user terminals 2200 of the viewing users based on the condition set by the stream setting unit.

The start instructions for such streaming are transmitted by selection of the stream start button D25 shown in FIG. 6.

As an example, the stream start unit streams (avatar-streams) information on the video (the first video) including an animation of the character object of a stream user to the viewing user terminals 2200 of the viewing users.

The information on the first video includes, for example, motion information indicating the motion of the character object, voice information on the stream user, and gift object information indicating gifts sent from other viewing users. The gift object information includes at least gift object ID information that identifies the type of a gift object, and position information indicating the position where the gift object is displayed.

The stream start unit can live-stream a video via the above-mentioned video stream platform.

Figure 7:
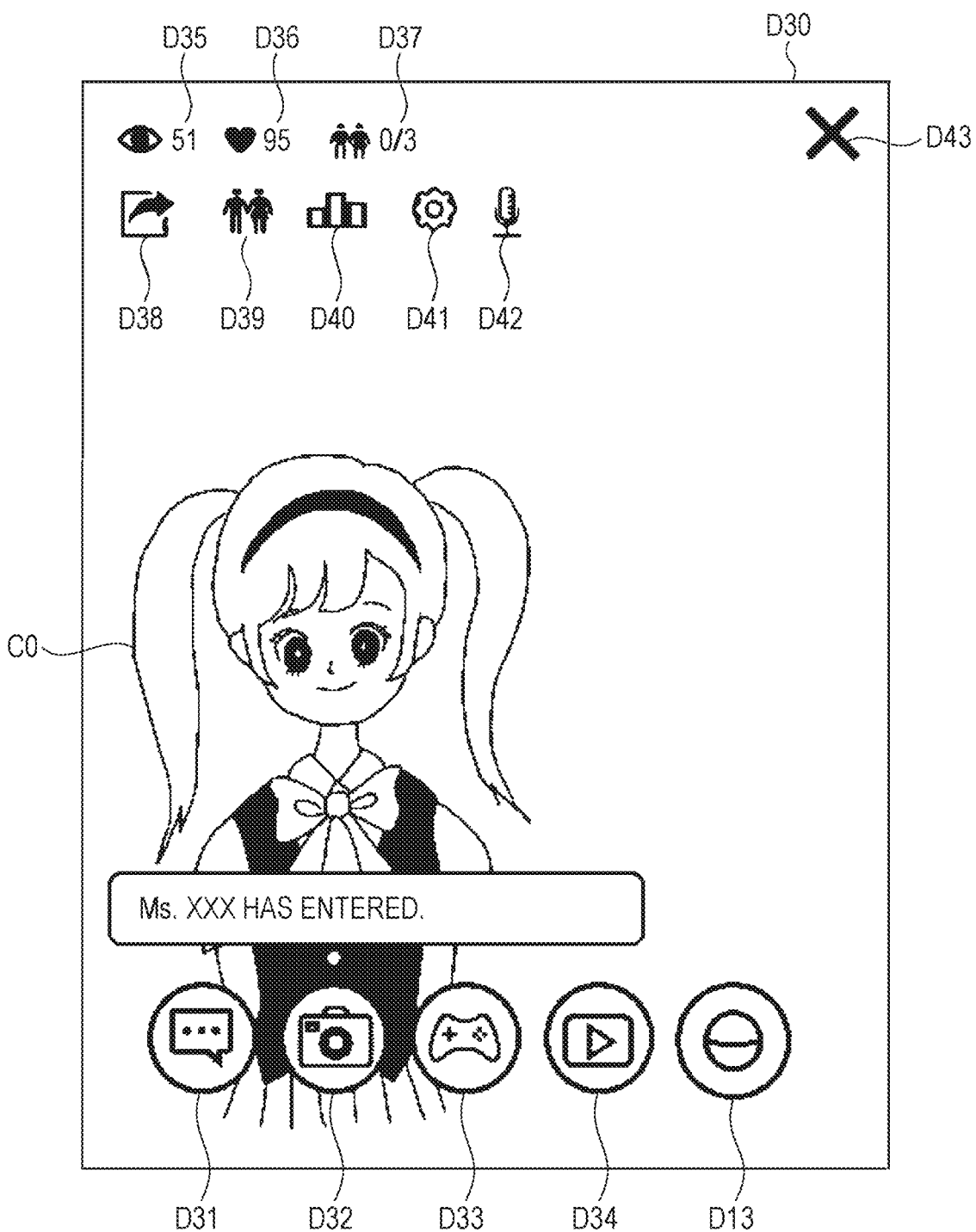
FIG. 7 is a conceptual illustration of an image of a screen displayed on a user terminal.

FIG. 7 shows the avatar stream screen D30 displayed on the stream user terminal 2100.

On the avatar stream screen D30, the character object CO can be displayed, and in addition, a comment input button D31 for a stream user to input a comment, a photo button D32 to store a still image of the screen, a play start button D33 to play the game described below, and an external service cooperation button D34 to view a video provided by an external service, and the gacha button D13 to obtain avatar parts can be displayed.

In addition, in the upper portion of the avatar stream screen D30, a cumulative number of viewers display D35, a cumulative number of likes display D36, a collaboration number of persons display D37, an external SNS share button D38, a guest detail button D39, a ranking display button D40, a setting button D41, and a voice switching button D42 to switch between ON/OFF of voice can be displayed. In addition, an end button D43 to end streaming is also displayed.

Although a detailed description of these displays and buttons is omitted, the stream setting set in the stream setting screen D20 can be modified by selecting the setting button D41.

Note that FIG. 7 shows an example in which streaming is started in the stream setting screen D20, where appearance of other users in the first video is permitted and the number of persons permitted to appear in the first video is three, thus the character object CO is displayed at the lower left. In a vacant space, up to three character objects of other users are permitted to appear.

The above is a description of the screen transition when the avatar streaming of the present disclosure is performed.

Subsequently, a screen transition when a stream user plays a game during streaming will be described.

One or a plurality of computer processors in the present disclosure may include a game request reception unit, a game video streaming unit, and a game display processor.

A stream user can make play start request for a game by selecting the play start button D33 in the middle of avatar streaming as shown in FIG. 7.

The game displayed by selecting the play start button D33 is a dedicated game installed in the application implemented by the information processing system in the present disclosure, and can be different from a general-purpose game provided by an external service. Thus, the game streaming in the present disclosure may be distinguished from streaming of a play video of a general-purpose game provided by an external service, along with live broadcast of a stream user.

Alternatively, the play start request can be transmitted from the stream user terminal 2100 to the information processing device 2400 by selecting a play start button arranged on a predetermined screen displayed on the stream user terminal 2100 of a stream user.

Figure 8:
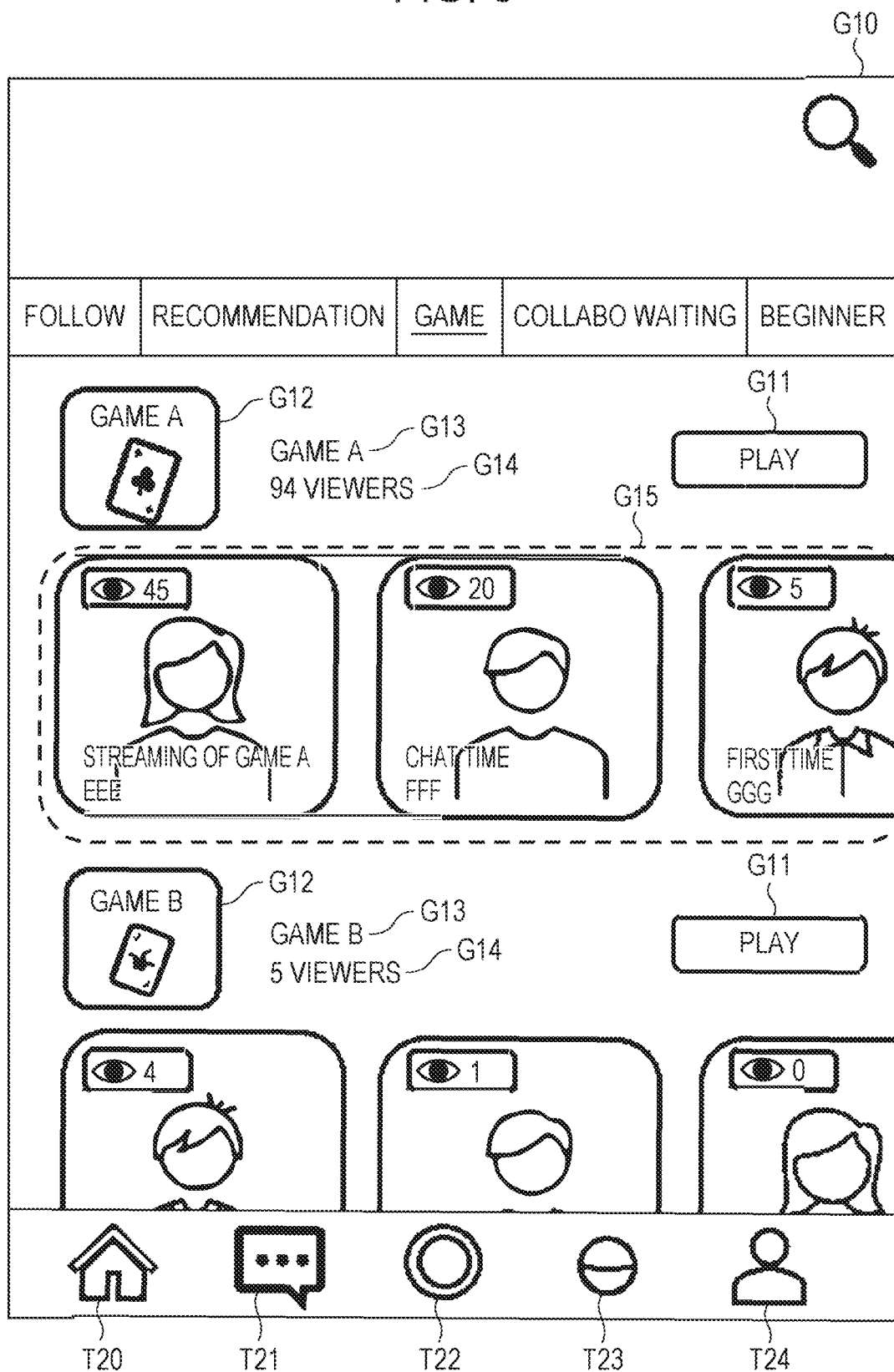
FIG. 8 is a conceptual illustration of an image of a screen displayed on a user terminal.

FIG. 8 shows, as the predetermined screen, an example of a screen G10 on which play start buttons G11 are arranged. The screen G10 shown in FIG. 8 is a screen transitioned by selecting the game tab T15 from the top screen T10 (FIG. 4) displayed on a user terminal in which an application implemented by the information processing system in the present disclosure is started.

On the screen G10, at least the play start buttons G11 are displayed to allow transmission of a play start request for a predetermined game.

When the game request reception unit receives a play start request for a predetermined game, the game streaming unit streams information on a second video to viewing user terminals.

Here, the second video is a play video for a predetermined game. In the present description, streaming to display such a video on the screens of viewing user terminals 2200 is called "game streaming".

After the start-up of the application implemented by the present disclosure, a user can transmit a stream start request for the second video to the information processing device 2400 as a stream user by selecting a play start object arranged on the game list screen and the game detail screen.

These game list screen and game detail screen are each a first screen described in detail in the following.

Specifically, the game display processor performs display processing for the first screen including: a stream start object to allow transmission of a stream start request, a play start object to allow transmission of a play start request for a predetermined game, and a thumbnail image of a video during streaming a play video for a predetermined game.

The screen G10 shown in FIG. 8 corresponds to the game list screen of the first screen. The first screen as the game list screen is transitioned from the top screen T10 by selecting the game tab T15.

The first screen includes: the stream preparation button T22 as a stream start object, the play start buttons G11 as play start objects, and thumbnail images showing video stream channels.

On the first screen, for each of multiple playable games, a play start button G11, a game icon G12, a game name G13, a total number of viewers G14 of the stream channel of the game, and a stream list G15 including the thumbnail images of the stream channels during game streaming are displayed.

The order of the thumbnail images displayed in the stream list G15 displayed here can be displayed differently depending on the viewing user. As an example, the thumbnail images are arranged in the priority order which is the descending order of the number of views by viewing users, the descending order of cumulative number of viewers, the chronological order of the start of streaming, provided that the stream channels are followed by viewing users. The display range of the thumbnail images of the stream list G15 can be modified by horizontal scroll.

The games displayed in the game list screen are obtained by reading top 10 priority titles. As an example, the priority is defined by the reverse chronological order of the date last played by one of viewing users within 30 days, the descending order of priority of period ID, or the descending order of period ID, within 48 hours from the game stream start date.

The stream list G15 is to be updated when returned from the screen of another tab and an update operation (Pull-to-Refresh) is performed.

Figure 9:
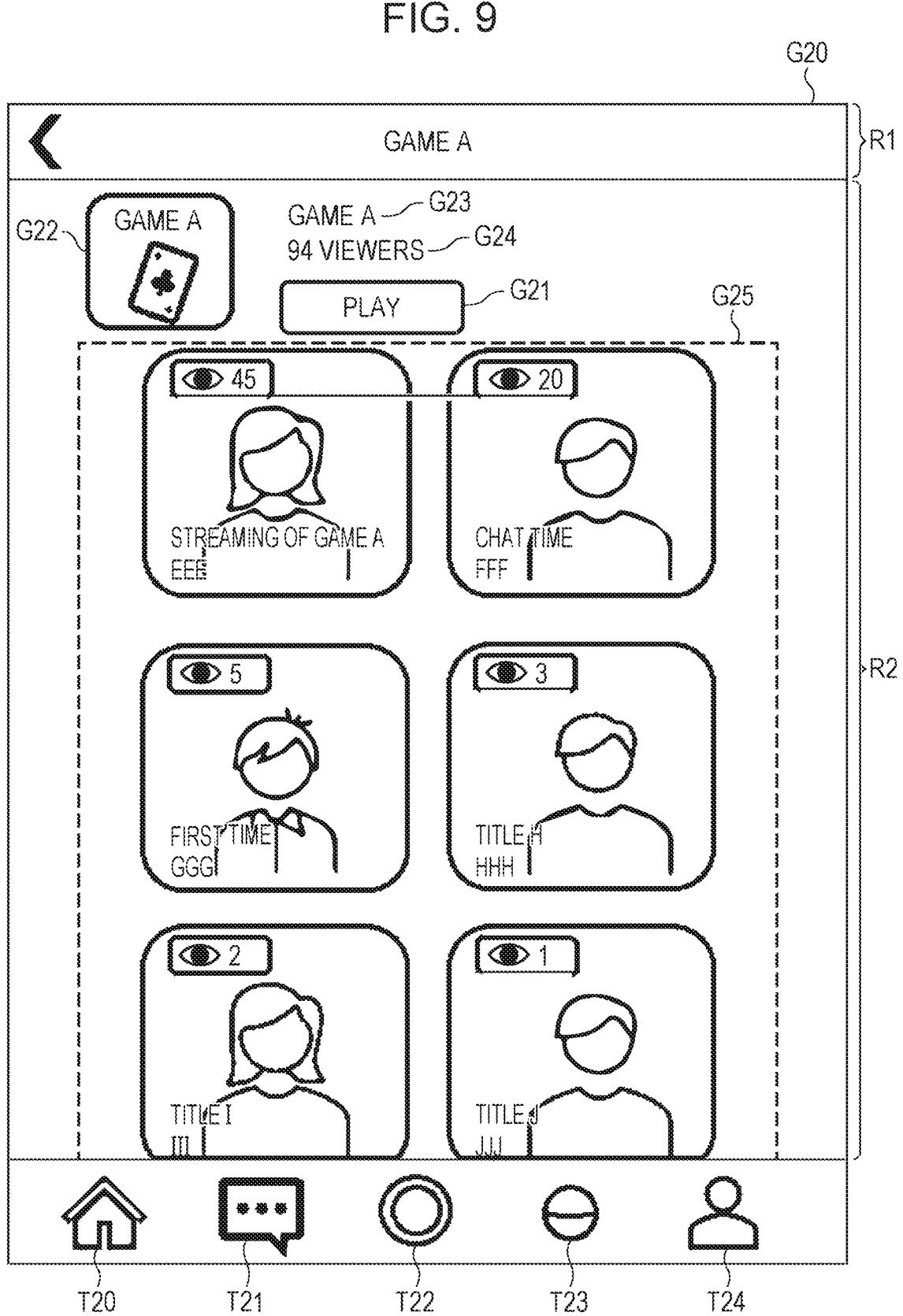
FIG. 9 is a conceptual illustration of an image of a screen displayed on a user terminal.

FIG. 9 corresponds to the game detail screen of the first screen. The first screen as the game detail screen is a screen G20 transitioned by selecting the game icon G12 or the game name G13 which are displayed in the game list screen shown in FIG. 8.

The first screen includes: the stream preparation button T22 which is a stream start object, the play start button G21 which is a play start object, and thumbnail images showing video stream channels.

In addition, on the first screen, a game icon G22, a game name G23, a total number of viewers G24 of the stream channel of the game, and a stream list G25 including the thumbnail images of the stream channel during game streaming are displayed.

The order of the thumbnail images displayed in the stream list G25 displayed here can be displayed differently depending on the viewing user. As an example, the thumbnail images are arranged in the priority order which is the descending order of the number of views by viewing users, the descending order of cumulative number of viewers, the chronological order of the start of streaming, provided that the stream channels are followed by viewing users. The display range of the thumbnail images of the stream list G25 can be modified by vertical scroll.

The stream list G25 is to be updated when returned from the screen of another tab and an update operation (Pull-to-Refresh) is performed.

As described above, a user who has selected the stream start object or the play start object becomes a stream user who makes a stream start request or a play start request.

In addition, a user who has selected a thumbnail image becomes a viewing user who views the second video.

The first screen includes a first region where a scroll operation is not possible and a second region where a scroll operation is possible.

The first screen referred to herein is the first screen shown in FIG. 9. The first screen includes a first region R1 and a second region R2. Specifically, in the first region R1, a game title is displayed, and in the second region R2, the play start button G21, the game icon G22, the game name G23, the total number of viewers G24, and the stream list G25 mentioned above are displayed.

The first region R1 is a portion where a scroll operation is not possible and display is fixed on the screen, and the second region R2 is a portion where a scroll operation by a user is possible. A user can check the thumbnail images hidden outside the screen by scrolling the second region R2.

However, the play start button G21 may be hidden outside the screen by scroll in the second region, thus the display processor in the present disclosure can display the play start object (play start button G21) in the first region R1 according to the display state of the play start object (the play start button G21) displayed in the second region R2.

Figure 10:
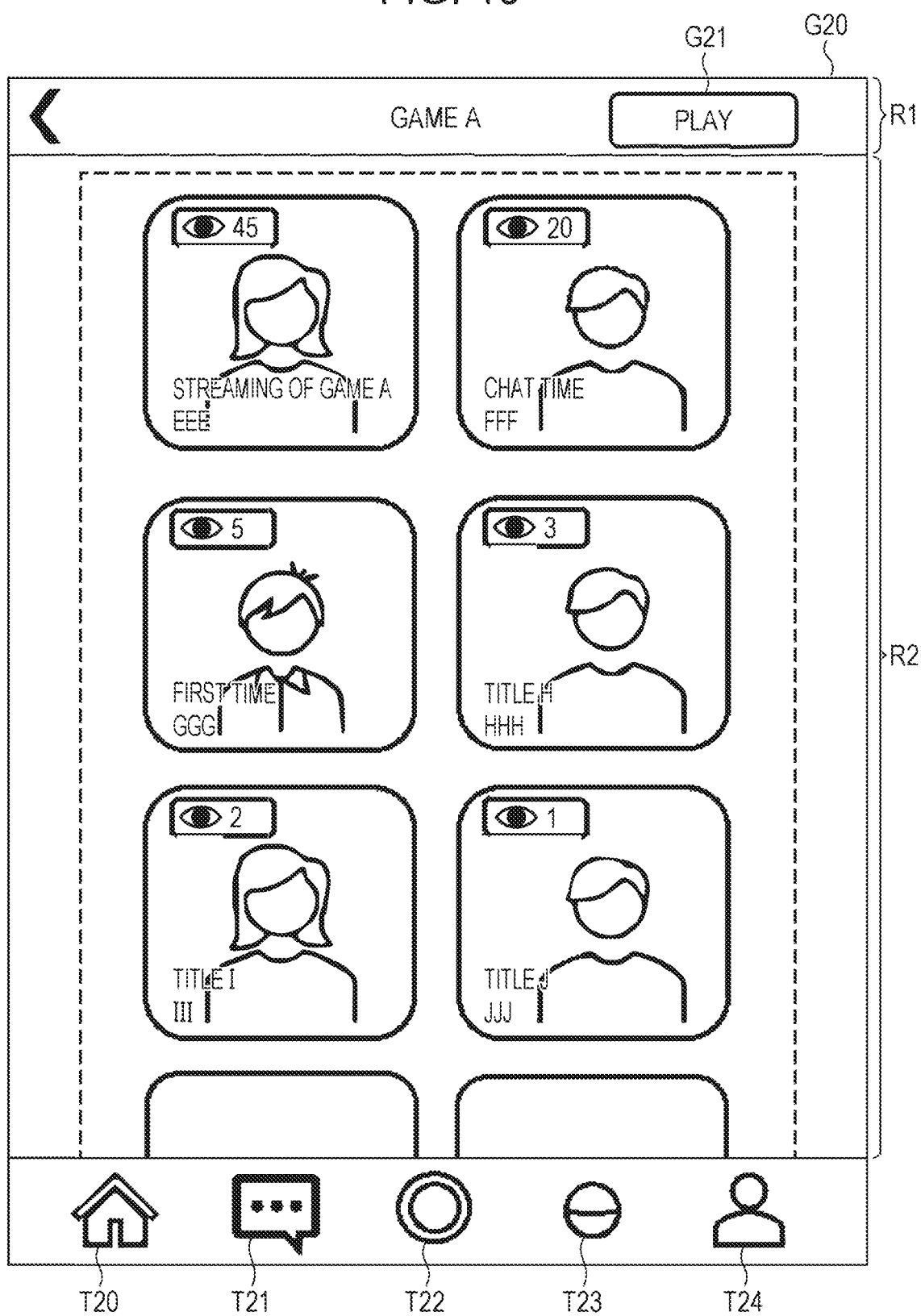
FIG. 10 is a conceptual illustration of an image of a screen displayed on a user terminal.

As an example, in FIG. 9, the play start button G21 is displayed in the second region R2, however, in FIG. 10, the play start button G21 is displayed in the first region R1. In other words, when part or all of the play start button G21 is not displayed in the second region R2, the play start button G21 is configured to appear in the first region.

Alternatively, the game display processor may display the play start object stepwise in the first region R1 according to the display state of the play start object displayed in the second region R2.

Such display can be implemented by changing the degree of transparency of the play start object according to the amount of scroll in the second region R2.

As an example, correspondence is made between the scroll amount (the unit is pixel) of 0 to 50 and the degree of transparency of button of 0.0 (completely transparent) to 1.0 (completely opaque). Then, in the initial display state, an object is completely transparent thus invisible, but when scrolling by 50 pixels or more is performed, the object is completely displayed. The degree of transparency of the object is preferably changed linearly between the scroll amounts (0 to 50). Note that the unit of scroll amount is logical pixel, and may be different from the actual pixel for display.

After information on the second video is streamed by the game streaming unit, the game request reception unit is assumed to be able to receive a play end request for a predetermined game from the stream user terminal 2100.

The play end request can be transmitted by selecting an end button arranged on the game screen.

When the game request reception unit receives a play end request for a predetermined game, the video streaming unit can end the streaming of information on the second video, and can stream information on the first video.

In other words, what is streamed here is not part of the information on the first video, but all of the information on the first video.

When the video streaming unit ends the streaming of the information on the second video, and streams the information on the first video, what is displayed on the viewing user terminal 2200 is the first video.

Subsequently, the flow to start viewing a video will be described.

One or a plurality of processors in the present disclosure may further include a viewing reception unit.

The viewing reception unit receives a viewing request for a video from a user.

In response to the viewing request, the video streaming unit streams, as video information, information on video image and voice to the information processing terminal of the user.

Figure 11:
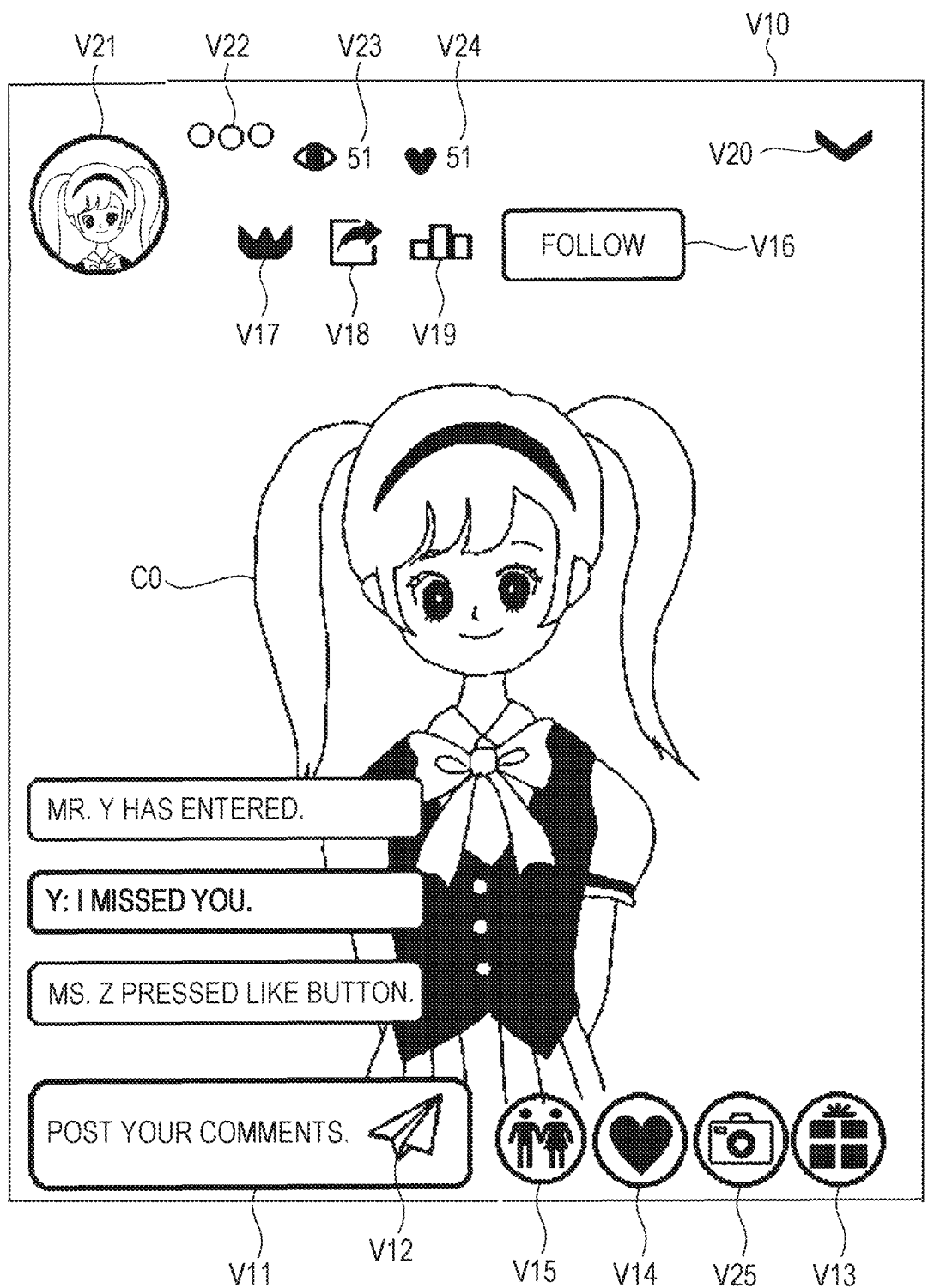
FIG. 11 is a conceptual illustration of an image of a screen displayed on a user terminal.

FIG. 11 is an example showing a viewing screen V10 of an avatar video displayed on the viewing user terminal 2200.

A viewing user can post a comment by inputting a text to comment post column V11 and pressing a transmission button V12.

Pressing a gift button V13 causes a gift list (screen V30 of FIG. 12) to be displayed for a viewing user, and a display request for a gift designated by selection can be transmitted.

Meanwhile, one or a plurality of processors in the present disclosure may include a determination unit. The determination unit determines whether a display request for a gift has been made from the viewing user terminal 2200.

The display request may include gift object information. The gift object information includes at least gift object ID information that identifies the type of the gift object, and position information indicating the position where the gift object is to be displayed.

As shown in FIG. 12, gifts can be displayed according to a classified group (such as free (charged) gift, accessories, support goods, appeal, variety).

Here, the charged gift is a gift which can be purchased by consuming my coin purchased by a viewing user, and the free gift is a gift which is available with or without consuming my point available by a viewing user for free.

Note that the term "gift" used in the present application refers to the same concept as the term "token". Therefore, even if the term "gift" is replaced by the term "token", the technique described in the present application can be understood.

In addition, a viewing user can post a favorable evaluation by pressing a like button V14. Note that in addition to or in replacement of the like button V14, it is possible to display a button for posting a negative evaluation or other feelings.

When a stream user sets that appearance of other users is permitted in the stream setting, application for appearance in the video can be transmitted by selecting a collaboration application button V15.

On the screen of a video streamed by a stream user not followed by any viewing user, a follow button V16 for a viewing user to follow the stream user is displayed. On the screen of a video streamed by a stream user already followed by a viewing user, the follow button functions as an unfollow button.

Note that the "follow" may be set by a viewing user for a viewing user, by a stream user for a viewing user, or by a stream user for a stream user. However, the follow is managed as the association only in one direction, and the association in the reverse direction is separately managed as follower.

In addition, a photo button V25 to store a still image of the screen can also be displayed.

On the viewing screen V10, a support ranking display button V17, a share button V18, a ranking display button V19 are also displayed.

The support ranking displays the ranking of each of viewing users who support the stream user, and the ranking can be calculated according to the amount (point/coin) of gift.

Regarding the share of video, a viewing user can check a sharable social networking service (SNS) list by pressing the share button V18, and can transmit a fixed link to a site designated by SNS specified by selection.

In addition, collaboration streaming can be requested to the stream user by pressing the collaboration application button V15. The collaboration streaming refers to causing the character object of a viewing user to appear in a video streamed by a stream user.

In the upper portion of the viewing screen V10, a stream user icon V21, a stream user name (character object name) V22, a cumulative number of viewers display V23, and a cumulative number of likes display V24 can be displayed.

When a viewing end button V20 is selected, a screen to end viewing is extended, and a viewing end request can be transmitted.

The screen to end such viewing will be described in detail. The screen is called a "small window voice stream", and the image of a video is for displaying and viewing in an aspect in which only voice is replayed.

Selection of the viewing end button V20 is received by the viewing reception unit as a viewing end request for the video.

At this point, in response to the viewing end request, the video streaming unit ends streaming of information on the video image, however, does not end streaming of information on the voice.

It is characterized in that when information on video image and voice is streamed to a user terminal, the video image is displayed on the main screen of the user terminal, and when only the information on voice is streamed, the video image is not displayed on the user terminal, and a sub screen showing that a video is being viewed is displayed.

Figure 13:
FIG. 13 is a conceptual illustration of an image of a screen displayed on a user terminal.

FIG. 13 shows an image of a screen V50 on which the sub screen V51 is displayed.

When the sub screen V51 is displayed, the main screen displayed in the background transits to the previous screen before a video is viewed. For example, when transition is made from a recommendation tab to a viewing frame, the main screen is returned to the display of the recommendation tab, and when transition is made from a follow tab to a viewing frame, the main screen transits to the follow tab.

When the sub screen V51 is being displayed, an operation on the main screen is possible, and transition to another screen can be made.

On the sub screen V51, a profile image, a name, a title, and a voice icon by which voice output is visually recognizable are displayed.

Viewing can be completely ended by selecting an end icon V52 displayed on the sub screen V51.

Note that for ending the display of the video image, information transmitted from a server apparatus may not be displayed on the terminal, or transmission itself of information from the server apparatus may be stopped.

In such a configuration, another stream can be searched or chatting with another user can be enjoyed while hearing only voice.

Next, the "collaboration" in which other users appear in the video of a stream user will be described.

As described above, a viewing user presses the collaboration application button V15 shown in FIG. 11 to display a confirmation screen for a collaboration stream participation request, then can transmit a participation request for the video.

In response to the participation request received by the reception unit, a collaboration avatar display unit causes a character object to be displayed in the video, the character object being generated based on the motion of the viewing user who has made the participation request.

Figure 14:
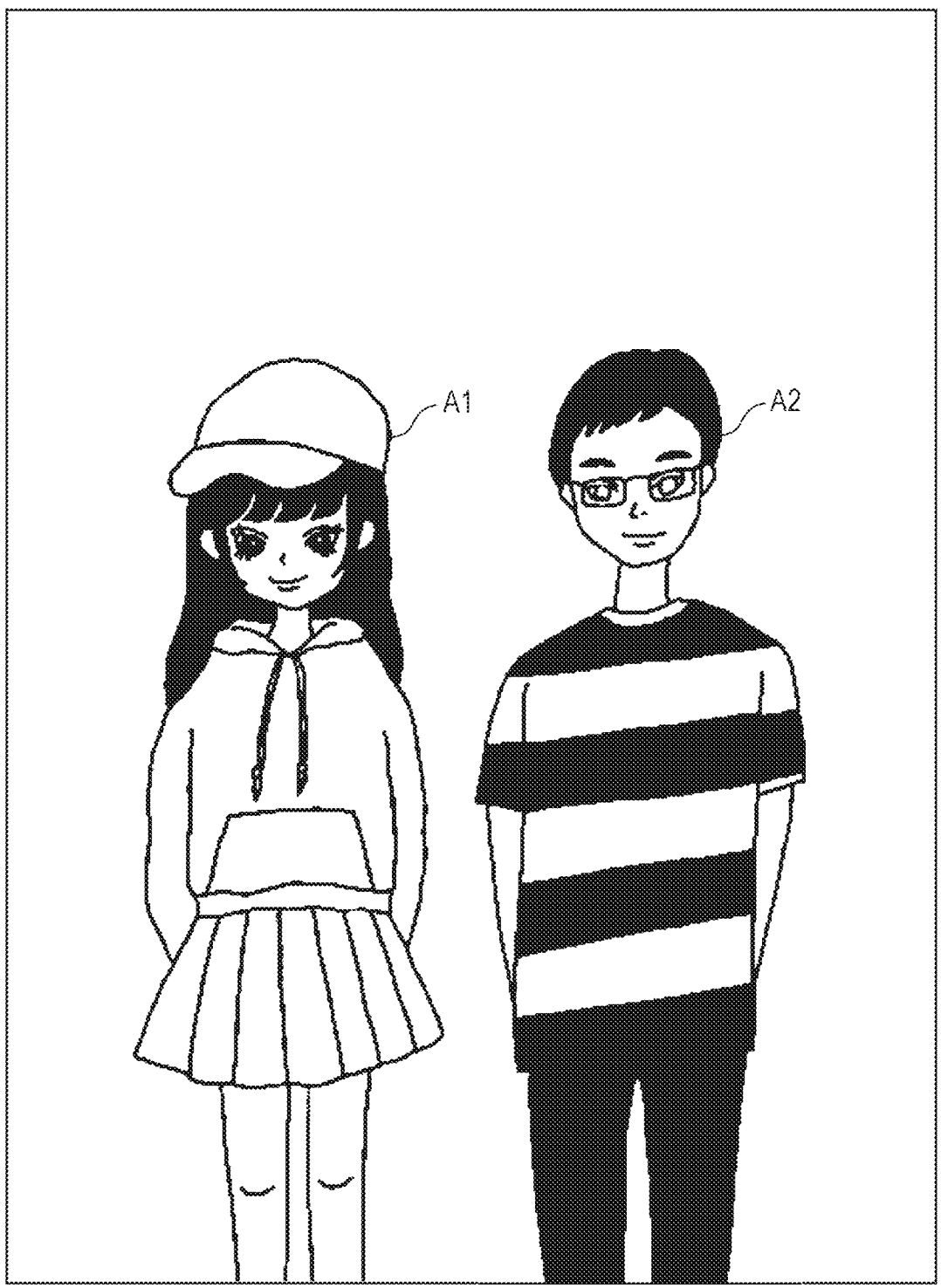
FIG. 14 is a conceptual illustration of an image of a screen displayed on a user terminal.

As an example, FIG. 14 shows a viewing or stream screen when a second avatar A2 that is the character object of a guest user participates in the video in which a first avatar A1 that is the character object of a host user is displayed. Note that in FIG. 14, display of objects other than the avatars is omitted.

Figure 15:
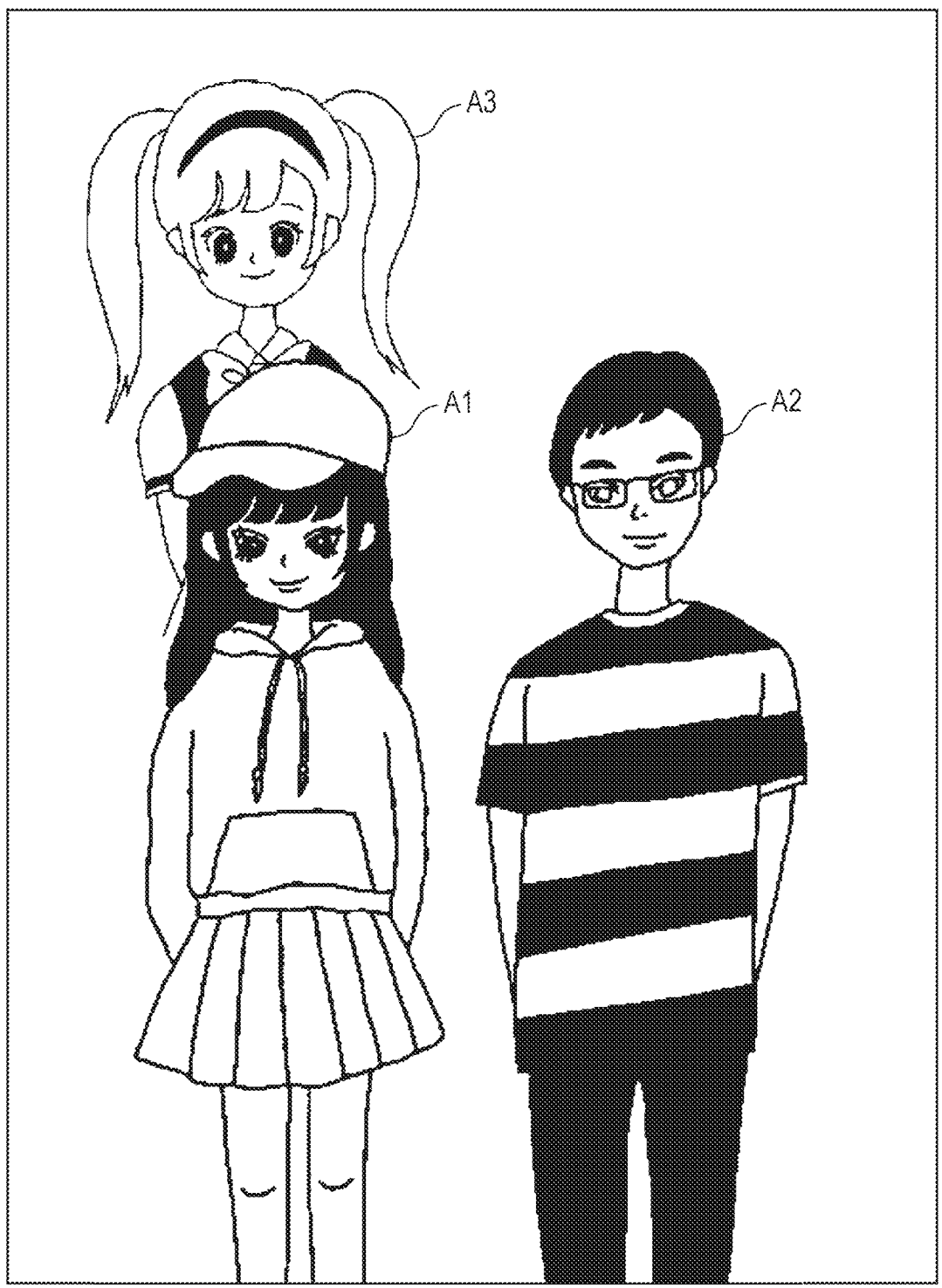
FIG. 15 is a conceptual illustration of an image of a screen displayed on a user terminal.

In addition, as shown in FIG. 15, a third avatar A3 that is the character object generated based on the motion of another viewing user may participate in the video. In FIG. 15, the third avatar A3 is arranged in the back of the first avatar A1 and the second avatar A2; however, three avatars may be arranged side by side in a horizontal row. The arrangement position of each avatar may be designated by a stream user.

Figure 16:
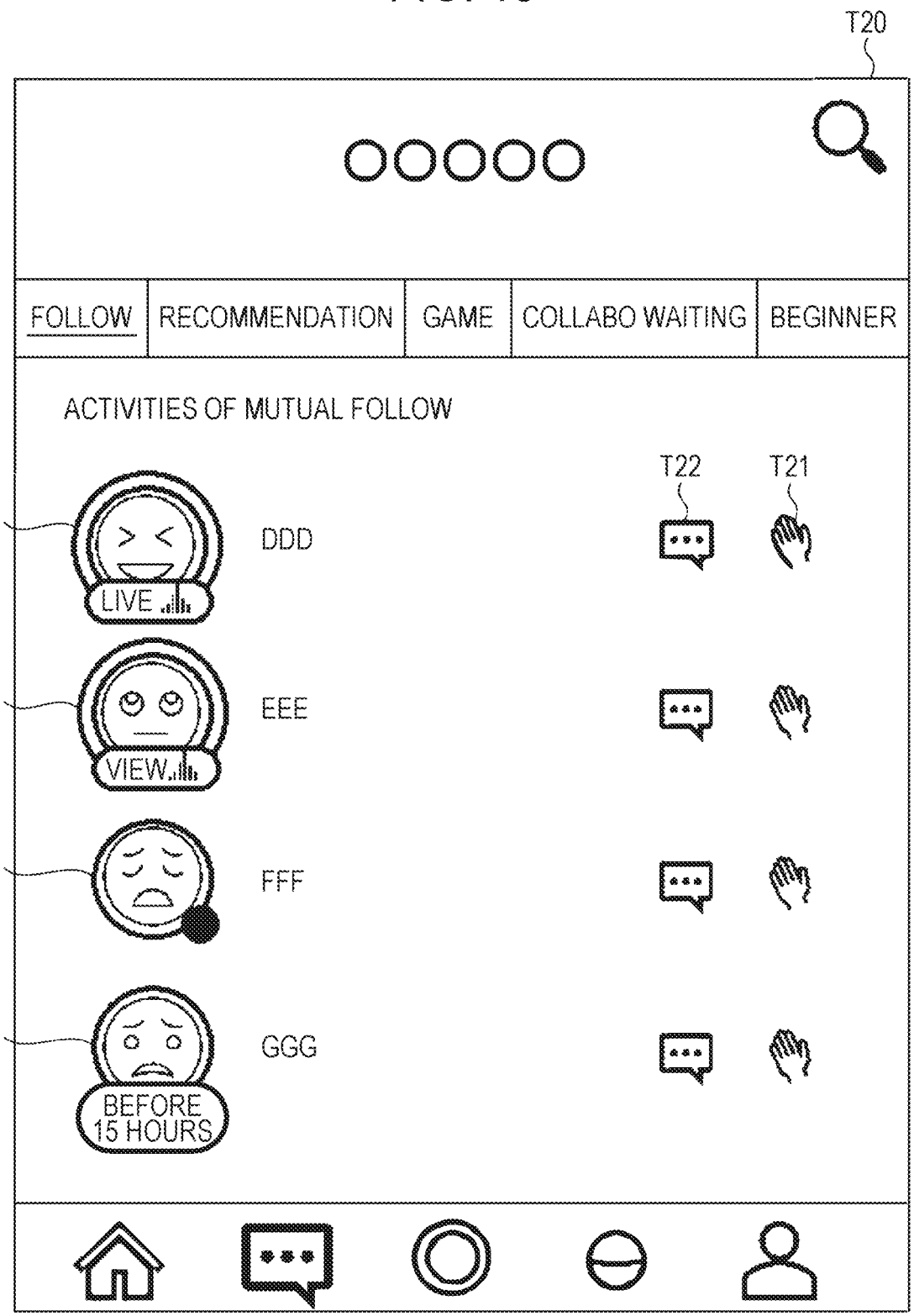
FIG. 16 is a conceptual illustration of an image of a screen displayed on a user terminal.

FIG. 16 shows a list screen T20 of users having mutual follow relationships, which is displayed by selecting the follow tab at the top screen shown in FIG. 4. The mutual follow refers to a relationship in which each of two users is a follower of the other user.

In the list screen T20, the profile images and the names of users (second users) having mutual follow relationships are displayed.

As shown in FIG. 16, in the list screen T20, a first object T21 is displayed for each of the users having mutual follow relationships. Alternatively, a chat object T22 may be displayed along with the first object T21. Selecting the chat object causes transition to be made to an individual chat screen for the second user.

The first object T21 transmits a predetermined notification to a terminal 2200 of the second user associated with the first object T21.

As an example, the predetermined notification may be a call notification.

<Functional Configuration>

Figure 17:
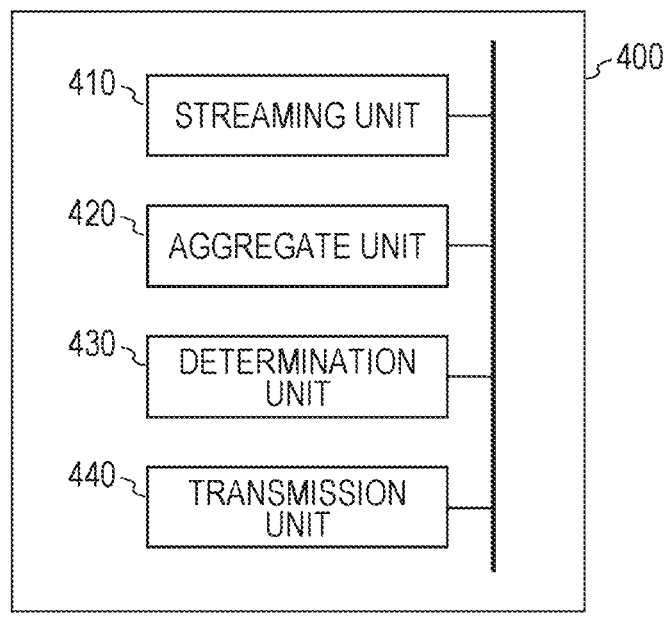
FIG. 17 is a configuration diagram of an exemplary functional configuration of the information processing device in the present disclosure.

FIG. 17 is a configuration diagram of an exemplary functional configuration of the information processing device. As shown in FIG. 17, the one or the plurality of computer processors 400 include a streaming unit 410, an aggregate unit 420, a determination unit 430 and a transmission unit 440.

The streaming unit 410 transmits information on a video including the character object of a stream user to the viewing user terminal 2200, thereby streaming the video to the viewing user terminal 2200.

Note that it is sufficient that the streaming referred to herein allow the video to be viewed at the viewing user terminal 2200, and rendering of the video may be performed by the information processing device 2400 or by the viewing user terminal 2200. The procedure to start streaming by a stream user is as described above.

The aggregate unit 420 aggregates the resulting information including information on the action by viewing users to a video during streaming of the video.

As an example, the action by each viewing user to a video during streaming of the video may provide one or more display requests for a gift, one or more posted comments, and/or one or more posted evaluations.

As described above, the display request for gift is made by designating one gift from a gift list displayed by selecting a gift button. At this point, the aggregate unit 420 can aggregate, as the resulting information, points according to the number of display requests or the quality (price) of gifts for which the display request is made.

As described above, comment posting can be made by inputting a text to a comment post column and selecting a transmission button. At this point, the aggregate unit 420 can aggregate, as the resulting information, points according to the number of comments or the quality (such as comment content and the number of characters) of the comments.

As described above, regarding the evaluation posting, a favorable evaluation (good) can be posted by pressing the like button. At this point, the aggregate unit 420 can aggregate, as the resulting information, points according to the number of posted evaluations or the quality of posted evaluations.

The points according to the quality of posted evaluations may refer to, for example, 1 point for one favorable evaluation (good), and −1 point for one negative evaluation (bad).

It is sufficient that the resulting information include information on at least one type of action; however, the resulting information may include information on multiple types of action. In this embodiment, a description will be given by way of example in which the number of posted evaluations is used as the resulting information to determine the later-described specific motion; however, this is not always the case.

The determination unit 430 determines a specific motion to be applied to the character object based on the resulting information aggregated by the aggregate unit 420.

The specific motion to be applied to the character object is so-called posing. Specifically, the determination unit 430 determines posing data to apply such posing to the character object.

The posing data is assumed to be pre-stored in a predetermined storage device included in or connectable to the information processing system in the present disclosure.

The determination of posing data may be made by a drawing method or based on the later-described classification.

The transmission unit 440 transmits the information on the specific motion determined by the determination unit 430 to the stream user terminal 2100.

It is characterized in that after end of streaming of the video, a resulting screen is displayed on the stream user terminal 2100, the resulting screen including a character image with a specific motion applied to a character object, the character image being generated based on the information on the specific motion, transmitted from the transmission unit 440.

As an example, after end of streaming of the video may refer to after selection of the end button D43 for streaming by a stream user.

Figure 18:
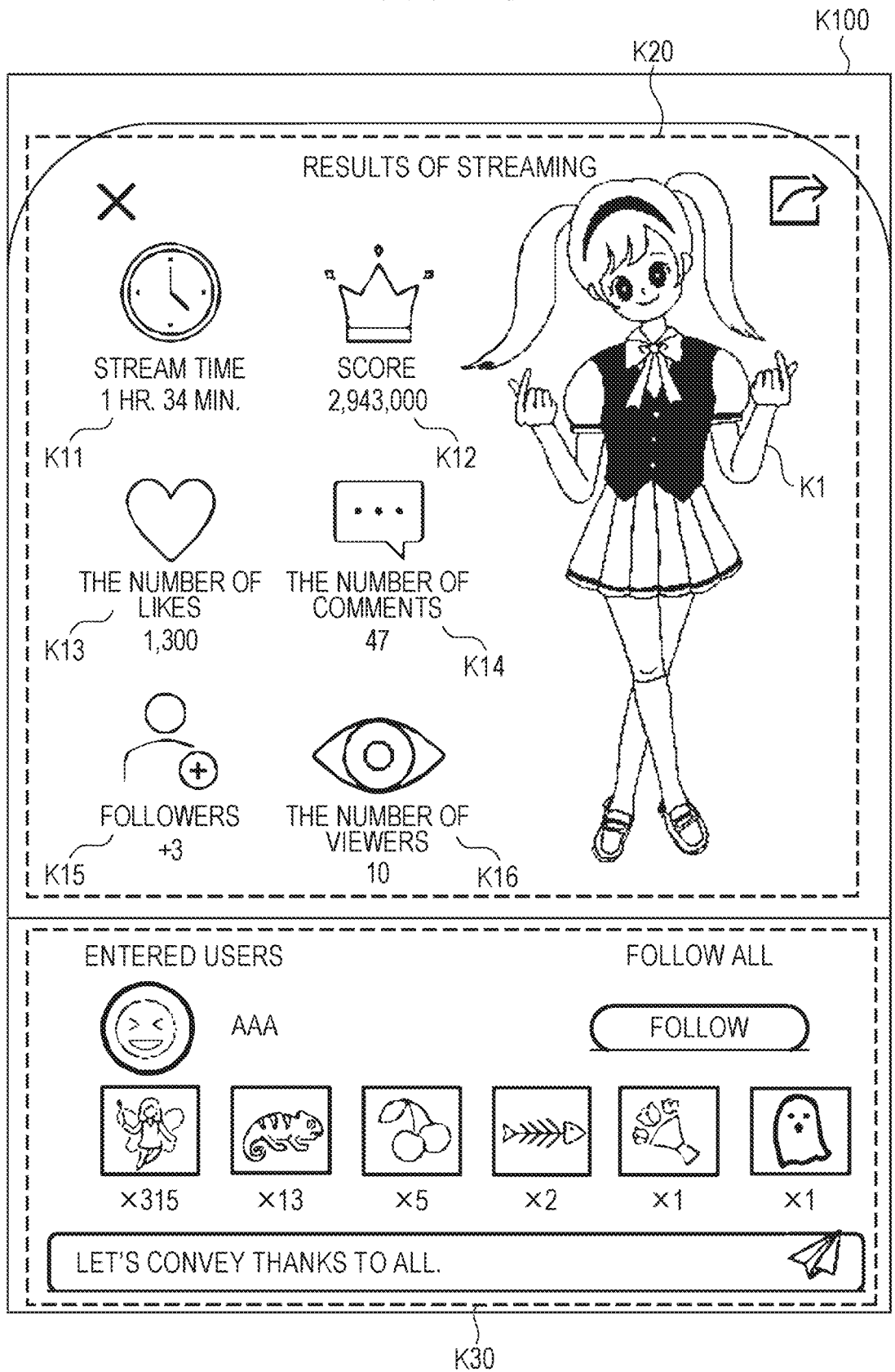
FIG. 18 is a conceptual illustration of an image of a screen displayed on a user terminal.

FIGS. 18 to 22 each show an example of a resulting screen. As shown in FIG. 18, a resulting screen K100 includes a character image K1 to which a specific motion is applied. The character image may be a still image or a moving image by an animation.

Figure 19:
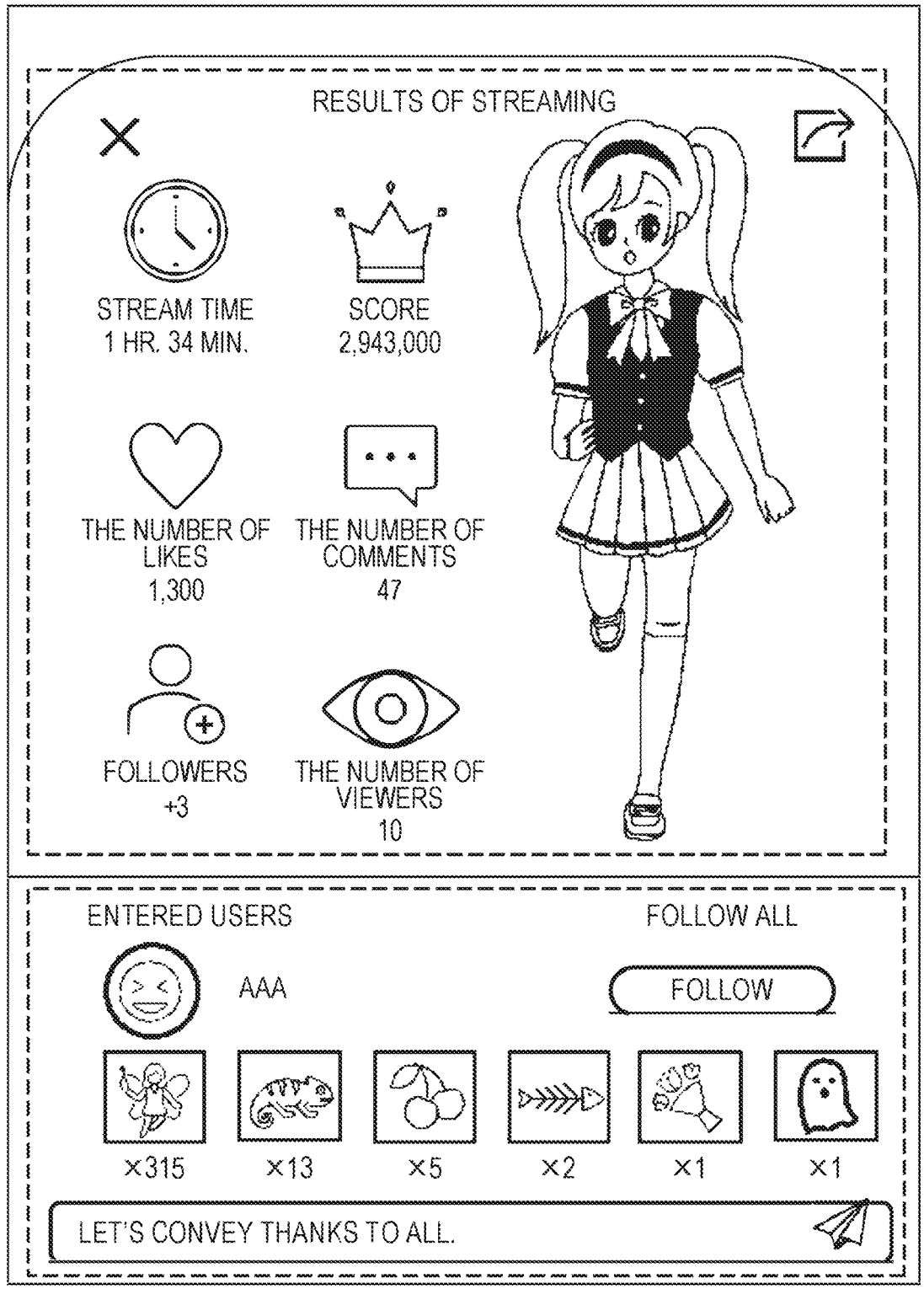
FIG. 19 is a conceptual illustration of an image of a screen displayed on a user terminal.
Figure 20:
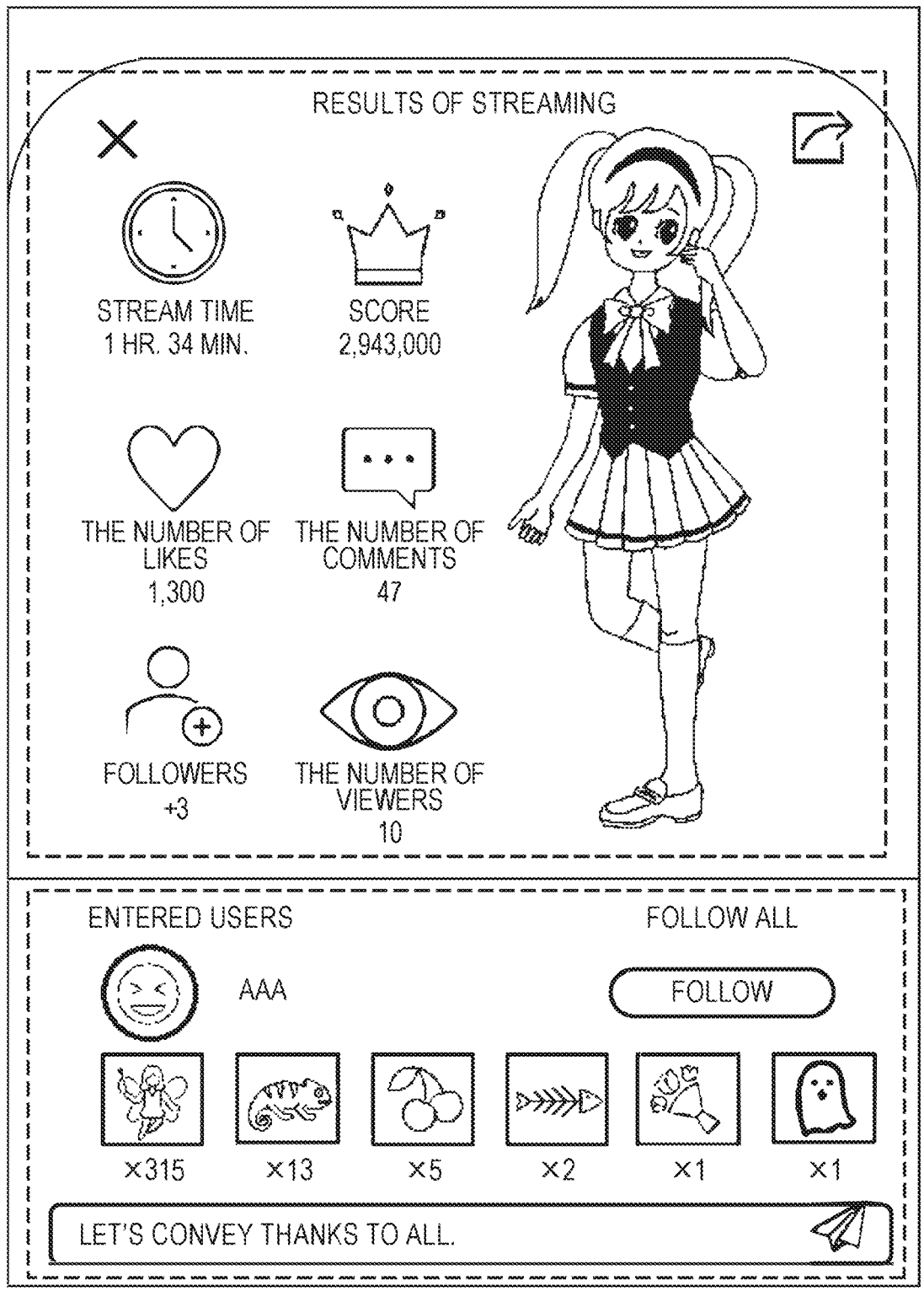
FIG. 20 is a conceptual illustration of an image of a screen displayed on a user terminal.
Figure 21:
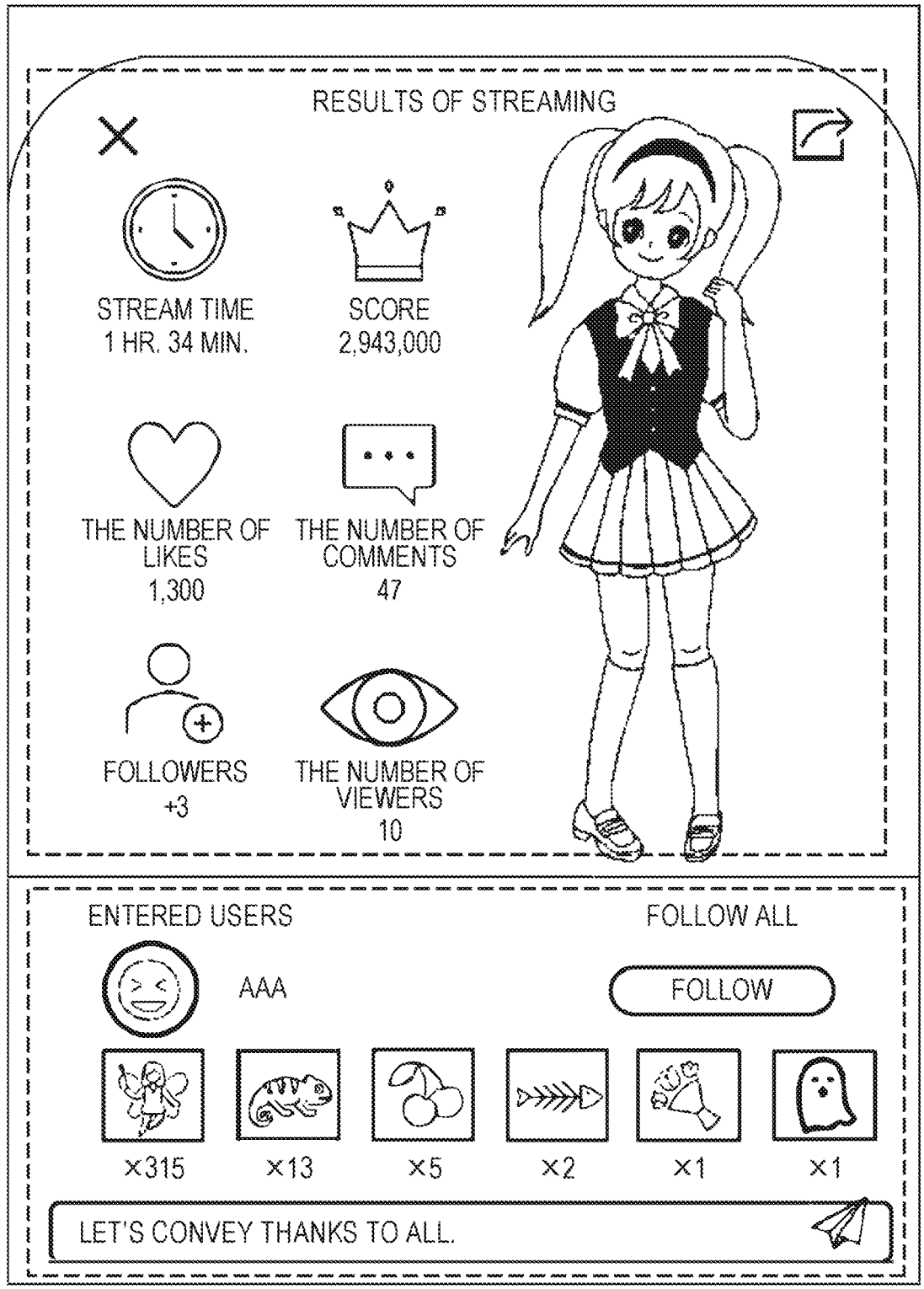
FIG. 21 is a conceptual illustration of an image of a screen displayed on a user terminal.
Figure 22:
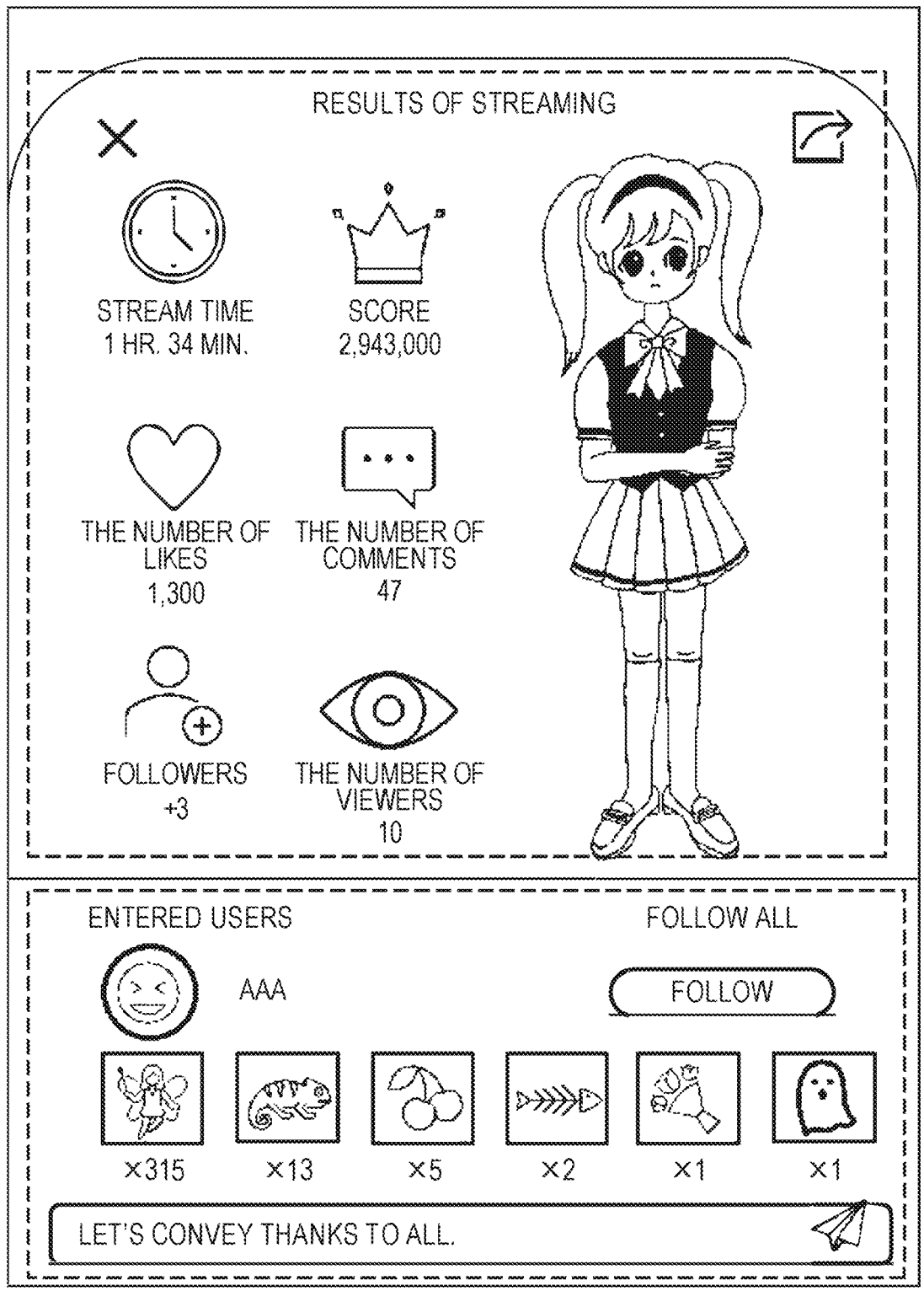
FIG. 22 is a conceptual illustration of an image of a screen displayed on a user terminal.

FIG. 18 is an example of a resulting screen including a character image to which a motion of finger heart is applied as the specific motion, FIG. 19 is an example of a resulting screen including a character image to which a motion of running is applied as the specific motion, FIG. 20 is an example of a resulting screen including a character image to which a motion with one hand on a cheek and one leg lifted is applied as the specific motion, FIG. 21 is an example of a resulting screen including a character image to which a motion with one hand on a cheek and pigeon-toed standing is applied as the specific motion, and FIG. 22 is an example of a resulting screen including a character image to which a motion of crossed arms is applied as the specific motion.

In this manner, when the streaming of the video is ended, a special character image to which a specific motion is applied is displayed on the resulting screen on the screen of a stream user according to the action (as an example, the number of posted evaluations) by a viewing user to the video. This is a reward to the achievement of streaming by a stream user.

Even when a stream user terminal has a small display screen like a smartphone, the consequences of streaming can be easily grasped at a glance.

With the above configuration, it is possible to provide technical improvement by which at least part of the above-mentioned problem in the related art can be coped with or relieved.

Specifically, a stream user is motivated to look at a character image of his/her own character in a specific motion, which leads to improvement of the quality (the streaming time and the streaming content) of the video. This is because the action by each viewing user to the video is a factor to determine the posing of the character image, thus it is necessary to improve evaluation from the viewing users.

The stream user saves and shares a stream screen including the special character image, thereby making it possible to keep a record of results of his/her own streaming and to receive praise from other users.

The viewing users are motivated to please the stream user they support, which leads to improvement of motivation of viewing and increase in the action to the video.

Although the determination unit 430 has been described to determine a specific motion to be applied to the character object based on the resulting information aggregated by the aggregate unit 420, alternatively, based on the resulting information aggregated by the aggregate unit 420, wearable objects (such as accessories, small articles, clothes, hairstyle) to be worn by the character object may be determined and information on such wearing objects may be transmitted, or a title (such as a catch phrase) may be determined and information on such a title may be transmitted.

The determination unit 430 can determine a motion associated with a classification corresponding to resulting information as a specific motion to be applied to the character object of the stream user, the resulting information being aggregated by the aggregate unit 420.

As described above, information on the action by viewing users to the video is the number of posted evaluations or the like, and the number of posted evaluations is divided by a predetermined range into divisions, each of which is associated with a motion.

FIG. 23 shows a data configuration in which the number (number of likes) of posted evaluations and each of motions are associated with each other, and shows that each of divisions is associated with a motion. Note that even the same division may be associated with a different motion depending on the type (such as sex and tribe) of avatar.

The predetermined range may be defined as an absolute value, or may be defined as a relative value such as top XX %.

As described above, the action by the viewing user to the video provides one or more display requests for a gift, one or more posted comments, and/or one or more posted evaluations to the video by the viewing user, and the aggregate unit 420 can aggregate the number of the one or more display requests, the number of the one or more posted comments and/or the number of the one or more posted evaluations to obtain the resulting information.

In addition, the transmission unit 440 transmits the resulting information aggregated by the aggregate unit 420 to the stream user terminal 2100, and the resulting information can be further displayed on the resulting screen K100.

Specifically, at least resulting information is displayed on the resulting screen K100, the resulting information being used to determine a specific motion to be applied to the character object. As an example, when the resulting information used to determine a specific motion is the number of likes, at least the number of likes is displayed on the resulting screen.

In addition, on the resulting screen K100, information K11 on the stream time of the video, information K12 on the score regarding streaming of the video, information K13 on the number of posted evaluations to the video, information K14 on the number of posted comments to the video, information K15 on the number of users associated with the stream user, and/or information K16 on the number of viewers of the video can be displayed.

In other words, resulting information other than the resulting information used to determine a specific motion can also be displayed on the resulting screen. In FIGS. 18 to 22, examples are shown in which the stream time as the information on the stream time of a video, the score as the information on the score regarding the streaming of a video, the number of likes as the information on the number of posted evaluations to a video, the number of posted comments as the information on the number of posted comments to a video, the number of followers as the information on the number of users associated with a stream user, and the number of viewers as the information on the number of viewers of a video are displayed along with respective icons.

The stream time is a time during which a video is streamed. The stream time is displayed in terms of hours and minutes with seconds truncated.

The score is a value calculated based on the worth of a gift for which a display request is made during streaming of a video.

The number of likes is an integral expression of an increase in the number of likes within the frame.

The number of comments is an integral expression of the number of comments within the frame. Note that the system comments are to be excluded from the comments to be counted.

The number of followers is the number of viewing users newly associated with a stream user during streaming of a video. When some viewing users cancel (unfollow) the association with the stream user during streaming of a video, only the increase with the number of some viewing users subtracted is shown. Note that when the increase is negative, 0 is displayed.

The number of viewers is the number of users who have viewed a video. Even when a user repeats to enter and exit from a channel during streaming of a video, the user is counted as a viewer each time. In other words, the number of viewers in the present disclosure is the cumulative number of viewers.

In this manner, streaming can be promoted in volume by visualizing the numerical accumulation of stream one by one, and it is possible to support a stream user so as to obtain a successful experience of events in the future.

The resulting screen shown in FIGS. 18 to 22 may be formed of a first region K20 where resulting information and a character image are displayed, and a second region K30 where a viewing user list is displayed. The image illustrating the details of the first region K20 is shown in FIGS. 24 to 29.

Figure 24:
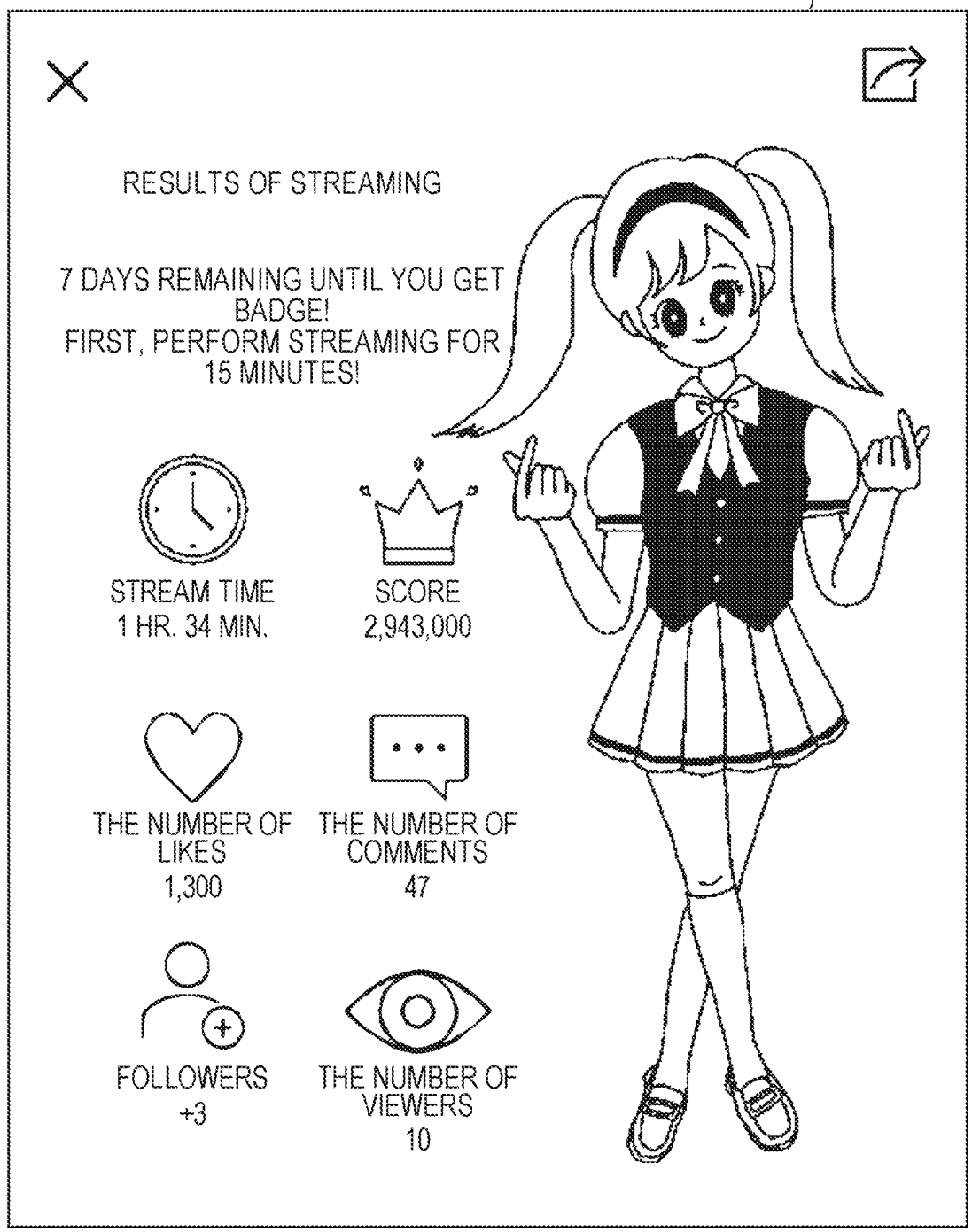
FIG. 24 is a conceptual illustration of an image of a screen displayed on a user terminal.

As shown in FIG. 24, in the first region K20 of the resulting screen, information (progress of daily streaming) on the number of consecutive days of streaming during which video streaming was performed can be displayed. As an example, in the embodiment of the present disclosure, a configuration may be adopted in which when a stream user streams a video for 15 minutes or more for seven consecutive days, the stream user is given a reward called a daily stream badge. The daily stream badge is an image T25 added to the thumbnail images of the stream channel shown in FIG. 4. The stream time acknowledged to be a period during which a video is streamed, and a specific numerical value of the number of days for which a reward is given are not particularly restricted.

Of the progress of daily streaming, a "NEW" icon is displayed when the stream time is 15 minutes or more. However, when streaming is performed twice or more per day, the "NEW" icon is displayed only for the first streaming with 15 minutes or more.

Of the progress of daily streaming, the text is changed according to the number of consecutive days of streaming when the streaming is ended.

Specifically, when the number of consecutive days of streaming is 0, as shown in FIG. 24, the text "7 DAYS REMAINING UNTIL YOU GET BADGE! FIRST, PERFORM STREAMING FOR 15 MINUTES" is displayed. The remaining number of days and a target stream time may be changed as appropriate according to the setting.

Figure 25:
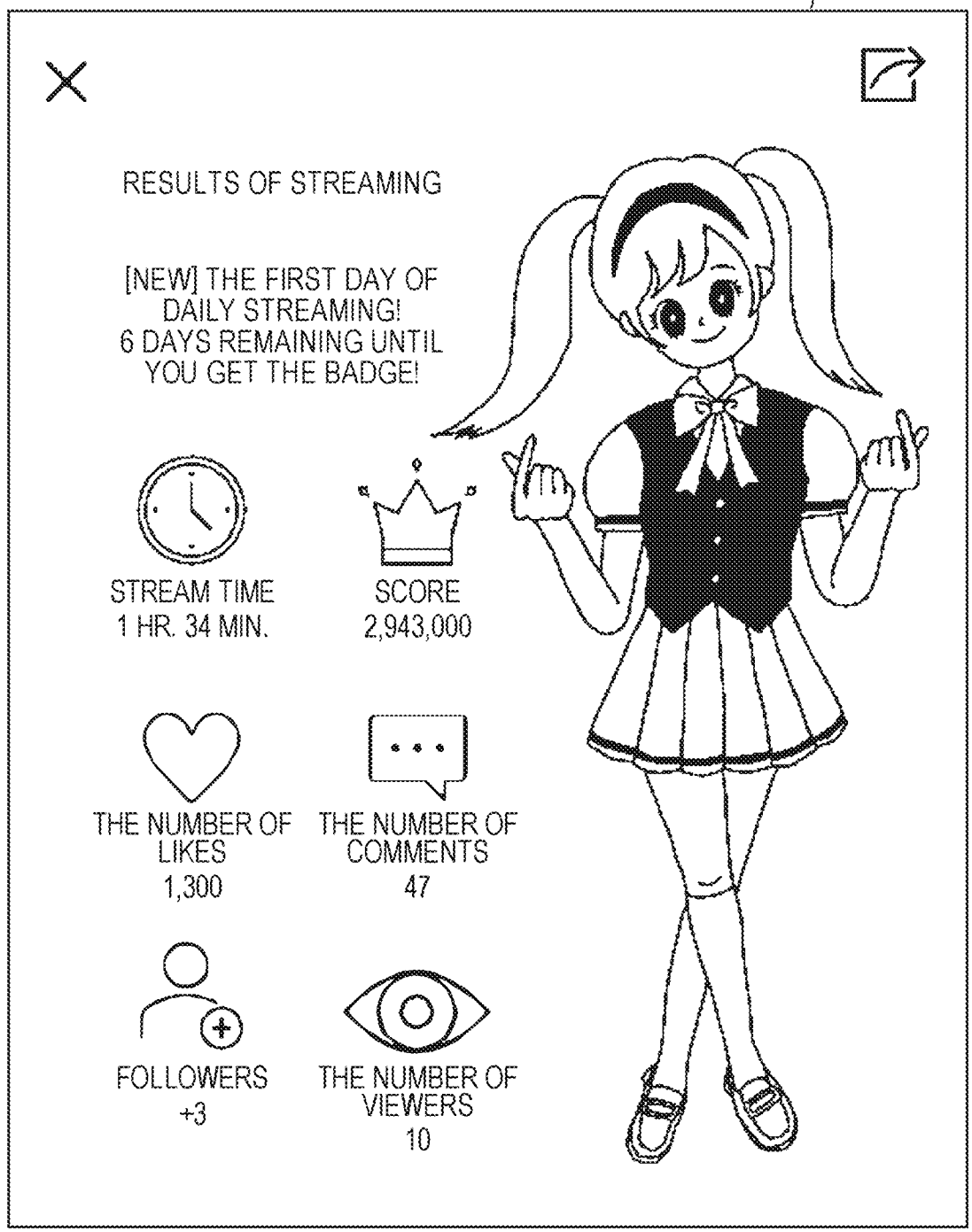
FIG. 25 is a conceptual illustration of an image of a screen displayed on a user terminal.

When the number of consecutive days of streaming is 1 or greater and 6 or less, as shown in FIG. 25, the text "THE nth DAY OF DAILY STREAMING! (7–n) DAYS REMAINING UNTIL YOU GET THE BADGE!" is displayed. Here, n is an integer of 1 or greater and 7 or less, and represents the number of consecutive days of streaming for 15 minutes or more based on the current result of streaming.

Figure 26:
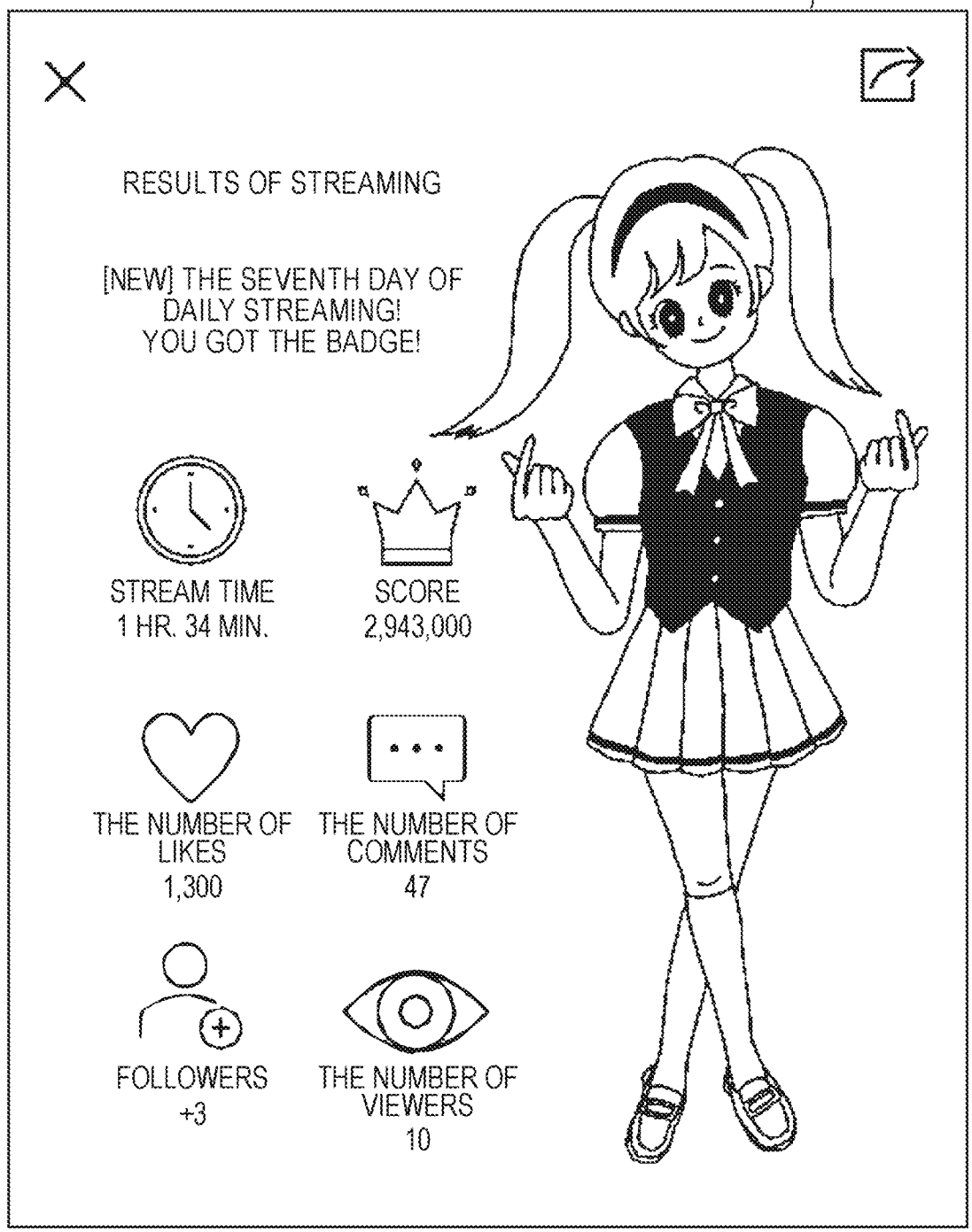
FIG. 26 is a conceptual illustration of an image of a screen displayed on a user terminal.

When the number of consecutive days of streaming is 7, as shown in FIG. 26, the text "THE SEVENTH DAY OF DAILY STREAMING! YOU GOT THE BADGE!" is displayed.

Figure 27:
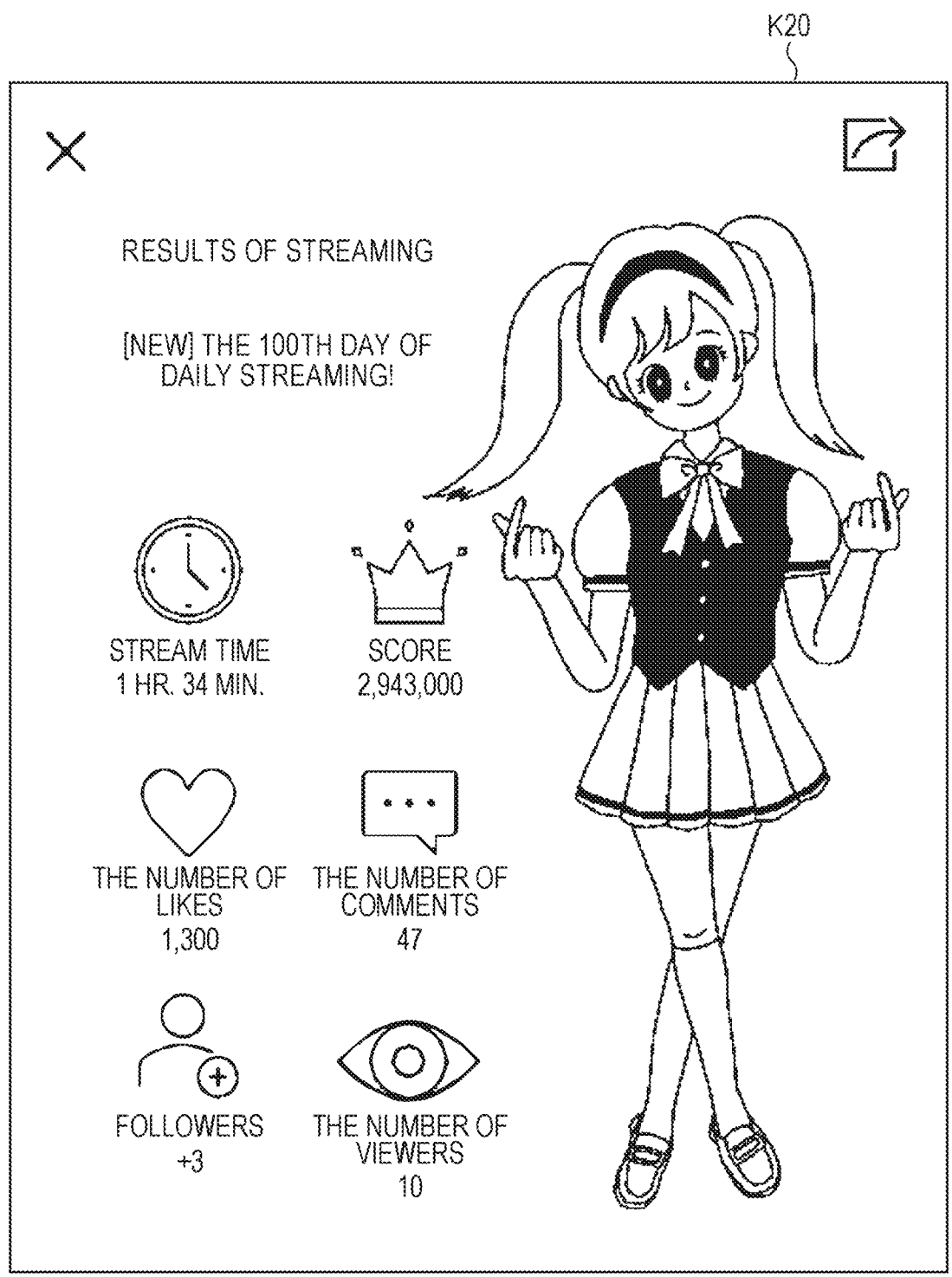
FIG. 27 is a conceptual illustration of an image of a screen displayed on a user terminal.

When the number of consecutive days of streaming is 8 or greater, as shown in FIG. 27, the text "THE nth DAY OF DAILY STREAMING!" is displayed. Here, n is an integer of 8 or greater, and represents the number of consecutive days of streaming for 15 minutes or more based on the current result of streaming.

Figure 28:
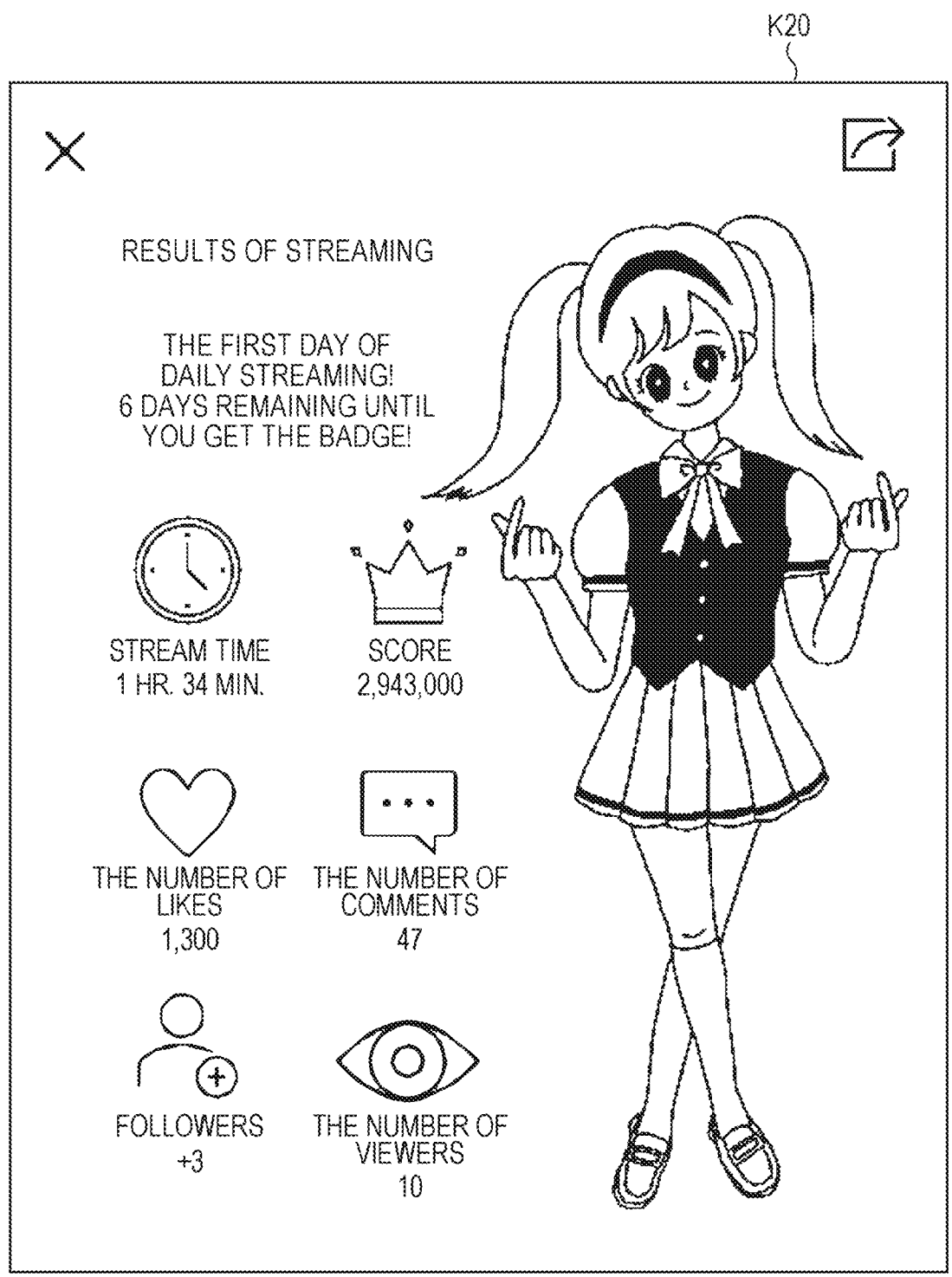
FIG. 28 is a conceptual illustration of an image of a screen displayed on a user terminal.
Figure 29:
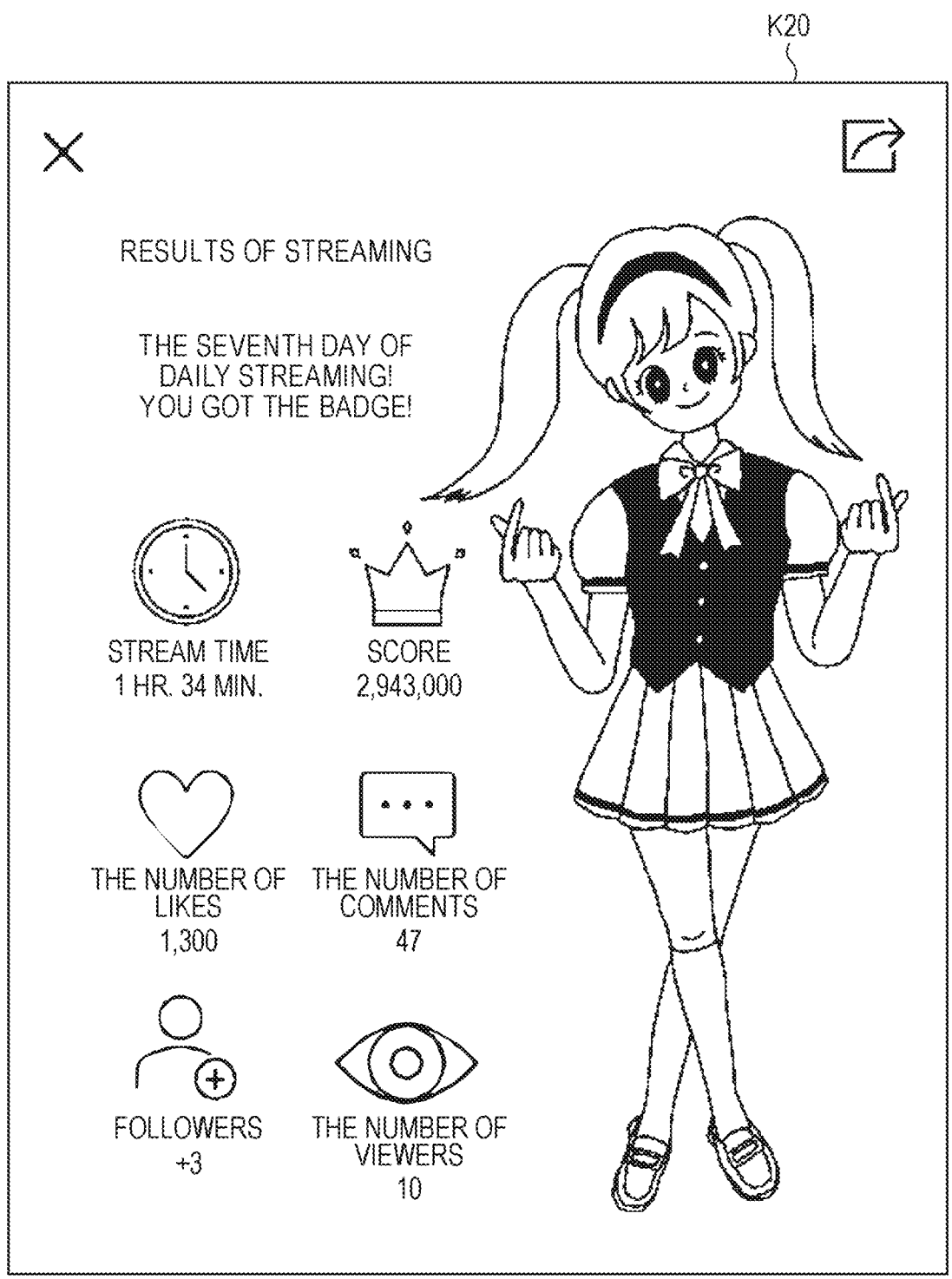
FIG. 29 is a conceptual illustration of an image of a screen displayed on a user terminal.

When streaming is performed with an insufficient stream time (short), as shown in FIGS. 28 and 29, the "NEW" icon is not displayed, and the text achieved last time is maintained.

With the above configuration, when the number of consecutive days of streaming of a stream user does not reach the number of days' worth receiving a badge, a motivation of streaming can be given to the stream user by showing a goal, and it is possible to increase the stream users who perform consecutive streaming.

In addition, on the resulting screen, a viewing user list, in which the viewing users of the video are arranged in a predetermined order, can be displayed.

Figure 30:
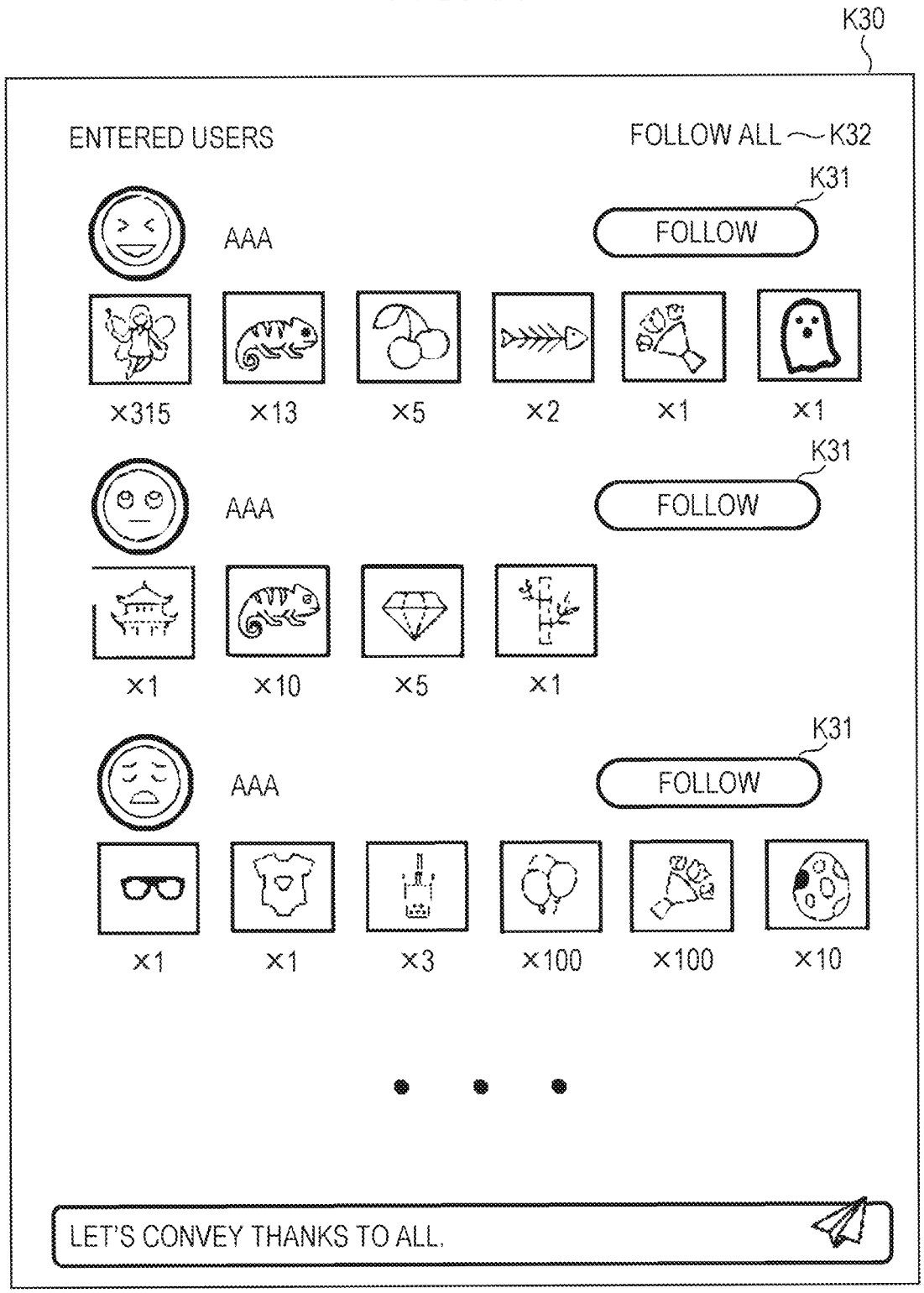
FIG. 30 is a conceptual illustration of an image of a screen displayed on a user terminal.

The image illustrating the details of the second region K30 is shown in FIG. 30.

As shown in FIG. 30, in the viewing user list, all the users who enter and leave the channel of the streamed video are displayed in a predetermined order from above. The predetermined order may be the descending order of the degree of contribution to the video. The degree of contribution is to be determined by score. Alternatively, the degree of contribution may be determined by the viewing time or the number of comments.

For the same score, a user "entering the channel for the first time" (watching streaming of the stream user for the first time) is displayed at a higher position, and furthermore, a viewing user not followed by the stream user is displayed at a higher position.

As shown in FIG. 30, a button K31 to follow each of the viewing users individually, and a button K32 to follow the viewing users collectively can be displayed. In addition, a message column to collectively transmit a message conveying thanks for viewing can also be displayed.

As shown in FIG. 30, in the viewing user list, gift images each showing a gift for which a viewing user has made a display request during viewing of the video is displayed along with the number of display requests for the gift.

When a viewing user has made a display request for multiple gifts during viewing of the video, gift images may be arranged and displayed in a specific order.

In the specific order, a coin gift (charged) is placed higher than a point gift (free). The specific order may be the descending order of the calculation result of the worth of a gift (the number of coins/the number of points) □ the number of gifts. In addition, a smaller gift ID is displayed at a higher position. As an example, the upper limit of displayed gifts is 10; however, the upper limit is not limited to 10.

The gifts regarded as exceeding the upper limit are displayed as "other n gifts". "n" herein is the number obtained by subtracting the number of displayed gifts from the total number of gifts, and is not the number of kinds of gift, but the number of gifts.

Figure 31:
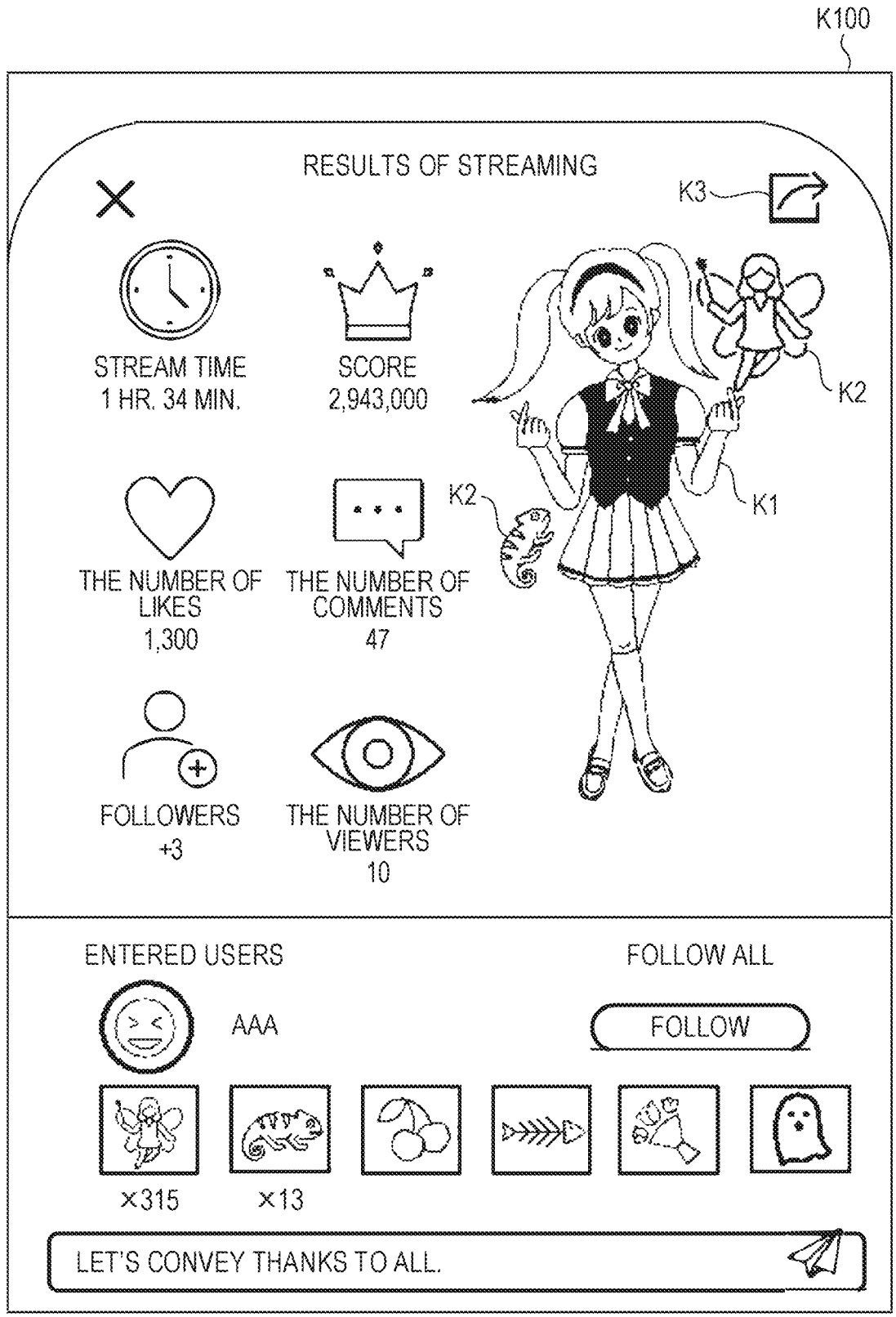
FIG. 31 is a conceptual illustration of an image of a screen displayed on a user terminal.

As shown in FIG. 31, on the resulting screen K100, a specific gift K2 can be displayed along with the character image K1, the specific gift K2 being selected from the gifts for which the viewing users have made a display request.

The specific gift selected can be the gift with the highest quality (most expensive) or the gift presented most frequently among the gifts presented during the streaming of a video. Note that the number of selected specific gifts may be one or plural. As one of the achievements, an image of the gift may be saved as a keepsake.

In this situation, on the resulting screen K100, a share icon which allows a character image to be shared can be displayed for each viewing user who has made a display request for the specific gift.

In other words, a character image can be transmitted to a viewing user who has sent a gift displayed along with the character image. Such a character image can bel transmitted along with a message of thanks.

On the resulting screen K100, a share icon K3 which allows a character image to be shared can be displayed for viewing users or other users.

Such a character image may be automatically transmitted (shared) to viewing users along with a thank you message. Alternatively, a configuration may be adopted in which an image can be transmitted to an external SNS by selecting the share button.

The character object to which a specific motion is applied may be the character object in the display mode included in the video immediately before a stream end request for the video is transmitted from the stream user terminal 2100.

During streaming, a stream user can change the character object to another character object prepared. Also, when gacha is done during streaming, the character object is changed to another character object which wears a wearing object obtained through the gacha. In the above example, a specific motion is applied to the character object in the display mode included in the video immediately before a stream end request for the video is transmitted from the stream user terminal 2100.

In the stream user terminal 2100, a confirmation screen regarding the display mode of the character object may be displayed before a stream end request for the video is transmitted.

The confirmation screen is for confirming whether the character object displayed on the video is used as the character to be displayed on the resulting screen. When an affirmative response is returned by a stream user, a specific motion is applied to the character object to generate a character image. When a negative response is returned, streaming is continued without generating a resulting screen. While the streaming is continued, a stream user can change the character to be displayed on the resulting screen by changing the displayed character to another character, and transmitting a stream end request again.

The aggregate unit 420 can aggregate the resulting information in response to the stream end request for the video transmitted from the stream user terminal 2100.

Although the aggregation has been described to start in response to reception of a stream end request for the video, the time until the resulting screen is displayed can be shortened by making aggregation each time the stream time reaches a predetermined time or at a predetermined interval.

The aggregate unit 420 can further aggregate the resulting information including information on the action by the stream user to a video during streaming of the video.

As an example, the action by the stream user provides streaming of a video by the stream user. In this case, the aggregate unit 420 can aggregate the stream time of the video provided by the stream user, and include the aggregated time in the resulting information.

The determination unit 430 then determines a specific motion to be applied to the character object based on the resulting information aggregated by the aggregate unit 420 and including information on the action by viewing users to the video and information on the action by the stream user to the video.

The stream time of a video of a stream user is useful information for the stream user, and in addition, the stream time can be a reference for other users when performing streaming, thus is also useful information for them. Thus, the stream time may be displayed on a stream screen of a video in real time as well as on a ranking page of various events as the information on the stream user.

Figure 32:
FIG. 32 is a conceptual illustration of an image of a screen displayed on a user terminal.

FIG. 32 shows a screen which displays a ranking based on the score of an event page, and on the screen, cumulative stream times in an event period are displayed as information on the stream users who are event participants.

The ranking is mainly determined by the scores based on gifts, and the stream times also contribute to acquisition of the gifts. Thus, as effective necessary conditions to climb the event ranking, the event ranking as well as stream times are displayed, which leads to clarification of the goal for beginner-level stream users. This leads to longer stream times of stream users, and provision of videos with higher quality.

Although the one or the plurality of computer processors have been described as components of the information processing device 2100 in this embodiment, the one or the plurality of computer processors may be included in the information processing device 2100, the stream user terminal 2100 and the viewing user terminals 2200 in a shared manner.

With the above configuration, it is possible to provide technical improvement by which at least part of the above-mentioned problem in the related art can be coped with or relieved. Specifically, it is possible to provide an information processing system capable of increasing the motivation of stream users for streaming and/or increasing the motivation of viewers for viewing.

In the above-described embodiment, each user can transmit and receive a message to and from another user; however, in the information processing system of the present disclosure, each user can receive various notifications from an administration as individual messages.

Conventionally, news from an administration have been displayed on a screen transitioned by selecting a notification icon (a bell-shaped icon in FIG. 4) displayed on the top screen; however, there has been a problem that important individual notifications such as winning an event prize are difficult to be recognized by users, and it takes time to cope with inquiries and reminding users.

Thus, in the present disclosure, to prevent a user from missing such an important individual notification, a user is informed of reception of an important notification using a message function. However, if the content of a notification needs to be changed, the content is displayed on a screen transitioned from the notification icon as in the previous manner.

As an example, when the language setting is Japanese, the message in the following paragraph is translated into Japanese and displayed as a message.

In addition, when the language setting is a language other than Japanese, the message is as follows: "You have received an important notice. Please check this link (URL of the notice). Also, we do not accept replies in this chat, so please check the instructions in the announcement".

Subsequently, an information processing method in the embodiment of the present disclosure will be described.

As shown in FIG. 2, the information processing method in the embodiment of the present disclosure is an information processing method in the information processing system 2000 that streams videos. The information processing system 2000 is characterized by including the stream user terminal 2100, the viewing user terminals 2200, and the information processing device 2400.

Figure 33:
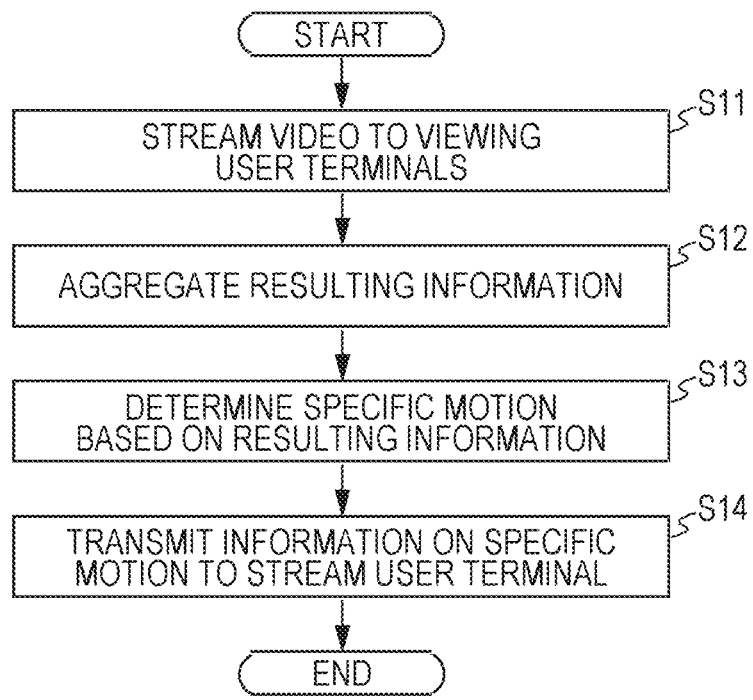
FIG. 33 is a flowchart showing an of a flow of an information processing method in the present disclosure.

As shown as an example in FIG. 33, the information processing method in the present disclosure causes the one or the plurality of computer processors included in the information processing system to execute stream step S11, aggregation S12, determination step S13 and transmission step S14.

In the stream step S11, a video is streamed to viewing user terminals by transmitting, to the viewing user terminals, information on the video including the character object of a stream user. The stream step S11 can be performed by the above-described streaming unit 410.

The stream step S11 may be performed by the server side (the information processing device 2400), or may be performed by the client side (the stream user terminal 2100).

In the aggregation step S12, resulting information is aggregated, the resulting information including the information on the action by viewing users to a video during streaming of the video. The aggregation step S12 can be performed by the above-described aggregate unit 420.

The aggregation step S12 may be performed by the server side (the information processing device 2400), or may be performed by the client side (the stream user terminal 2100).

In the determination step S13, a specific motion to be applied to the character object is determined based on the resulting information aggregated in the aggregate step. The determination step S13 can be performed by the above-mentioned determination unit 430.

The determination step S13 may be performed by the server side (the information processing device 2400), or may be performed by the client side (the stream user terminal 2100).

In the transmission step S14, information on the specific motion determined by the determination step is transmitted to the stream user terminal. The transmission step S14 can be performed by the above-mentioned transmission unit 440.

The transmission step S14 may be performed by the server side (the information processing device 2400), or may be performed by the client side (the stream user terminal 2100). In the latter case, all steps S11 to 13 are to be performed by the client side.

The information processing method in the embodiment of the present disclosure is characterized in that, after end of streaming of a video, a resulting screen is displayed on the stream user terminal 2100, the resulting screen including a character image with a specific motion applied to a character object, the character image being generated based on the information on the specific motion, transmitted in the transmission step S14.

With the above configuration, it is possible to provide technical improvement by which at least part of the above-mentioned problem in the related art can be coped with or relieved. Specifically, it is possible to provide an information processing system capable of increasing the motivation of stream users for streaming and/or increasing the motivation of viewers for viewing.

Subsequently, a computer program in the embodiment of the present disclosure will be described.

As shown in FIG. 2, the computer program in the embodiment of the present disclosure is a computer program executed by the information processing system 2000 that streams videos. The information processing system 2000 includes the stream user terminal 2100, the viewing user terminals 2200, and the information processing device 2400.

The computer program in the present disclosure is characterized by causing one or a plurality of processors included in the information processing system to implement a stream function, an aggregation function, a determination function and a transmission function. The stream function is such that a video is streamed to viewing user terminals by transmitting, to the viewing user terminals, information on the videos including the character object of a stream user.

The aggregation function is such that resulting information is aggregated, the resulting information including the information on the action by viewing users to a video during streaming of the video.

The determination function is such that a specific motion to be applied to the character object is determined based on the resulting information aggregated by the aggregate function.

The transmission function is such that information on the specific motion determined by the determination function is transmitted to the stream user terminal.

The computer program in the embodiment of the present disclosure is characterized in that after end of streaming of a video, a resulting screen is displayed on the stream user terminal, the resulting screen including a character image with a specific motion applied to a character object, the character image being generated based on the information on the specific motion, transmitted in the transmission step.

Figure 34:
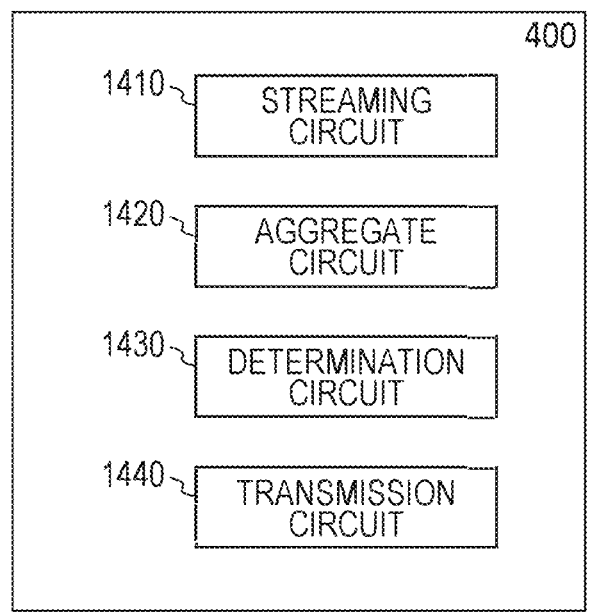
FIG. 34 is a circuit configuration diagram showing an exemplary circuit configuration in the present disclosure.

The above-mentioned functions can be implemented by a stream circuit 1410, an aggregate circuit 1420, a determination circuit 1430 and a transmission circuit 1440 shown in FIG. 34. The stream circuit 1410, the aggregate circuit 1420, the determination circuit 1430 and the transmission circuit 1440 are implemented by the above-described streaming unit 410, aggregate unit 420, determination unit 430 and transmission unit 440, respectively. The details of each unit are as described above.

With the above configuration, it is possible to provide technical improvement by which at least part of the above-mentioned problem in the related art can be coped with or relieved. Specifically, it is possible to provide an information processing system capable of increasing the motivation of stream users for streaming and/or increasing the motivation of viewers for viewing.

Subsequently, an information processing device 100 in the embodiment of the present disclosure will be described. The information processing device 100 corresponds to the stream user terminal 2100 in the information processing system 2000 described above.

Figure 35:
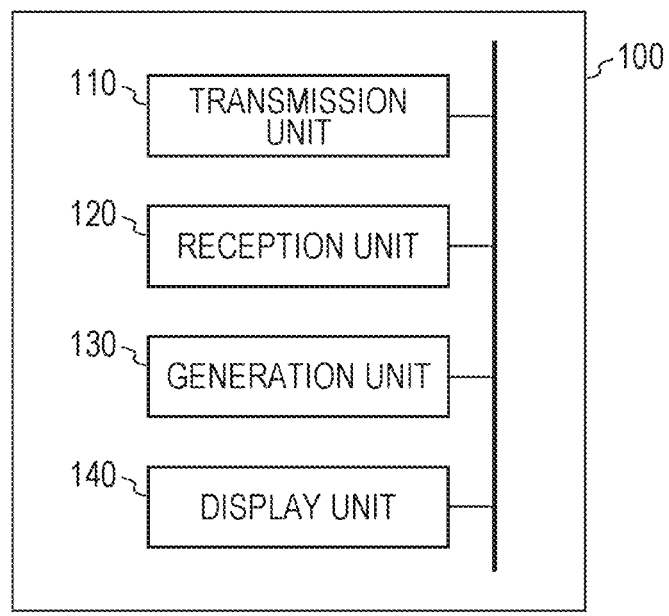
FIG. 35 is a configuration diagram illustrating an exemplary functional configuration of the information processing device in the present disclosure.

As shown in FIG. 35, the information processing device 100 in the embodiment of the present disclosure is characterized by including a transmission unit 110, a reception unit 120, a generation unit 130 and a display unit 140.

The transmission unit 110 transmits information on a video including the character object of a stream user.

The reception unit 120 receives information on a specific motion to be applied to the character object, the specific motion being determined based on the resulting information including information on the action by viewing users to the video.

After end of streaming of the video, the generation unit 130 generates a resulting screen including a character image with the specific motion applied to the character object based on the information on the specific motion received by the reception unit 120.

The display unit 140 displays the resulting screen.

With the above configuration, it is possible to provide technical improvement by which at least part of the above-mentioned problem in the related art can be coped with or relieved. Specifically, it is possible to provide an information processing system capable of increasing the motivation of stream users for streaming and/or increasing the motivation of viewers for viewing.

Subsequently, the information processing method in the embodiment of the present disclosure will be described. The information processing method is an information processing method performed by the information processing device 100 described above.

Figure 36:
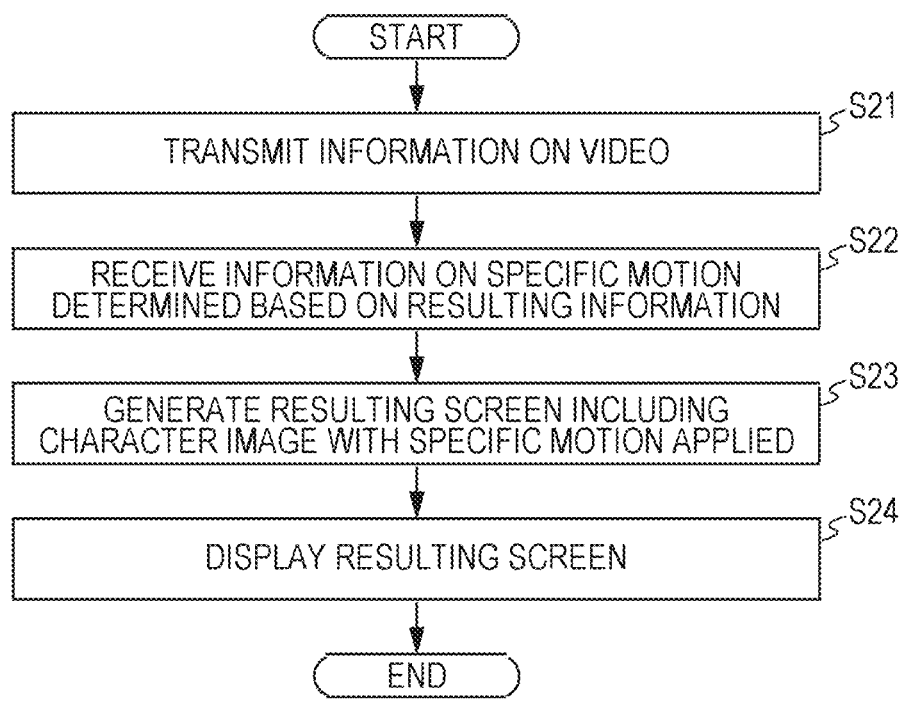
FIG. 36 is a flowchart showing an exemplary flow of the information processing method in the information processing device in the present disclosure.

As shown as an example in FIG. 36, the information processing method in the present disclosure is characterized by causing one or a plurality of computer processors included in the information processing device 100 to execute transmission step S21, reception step S22, generation step S23 and display step S24.

In the transmission step S21, information on a video including the character object of a stream user is transmitted. The transmission step S21 can be performed by the above-mentioned transmission unit 110.

In the reception step S22, information on a specific motion to be applied to the character object is received, the specific motion being determined based on the resulting information including information on the action by viewing users to the video. The reception step S22 can be performed by the above-mentioned reception unit 120.

In the generation step S23, after end of streaming of the video, a resulting screen including a character image with the specific motion applied to the character object is generated based on the information on the specific motion received in the reception step S22. The generation step S23 can be performed by the above-mentioned generation unit 130.

In the display step S24, the resulting screen is displayed. The display step S24 can be performed by the above-mentioned display unit 140.

With the above configuration, it is possible to provide technical improvement by which at least part of the above-mentioned problem in the related art can be coped with or relieved. Specifically, it is possible to provide an information processing system capable of increasing the motivation of stream users for streaming and/or increasing the motivation of viewers for viewing.

Finally, the computer program in the embodiment of the present disclosure will be described. The computer program is a computer program executed by the information processing device 100 described above.

The computer program in the present disclosure is characterized by causing one or a plurality of processors included in the information processing system to implement a transmission function, a reception function, a generation function and a display function.

The transmission function is such that information on a video including the character object of a stream user is transmitted.

The reception function is such that information on a specific motion to be applied to the character object is received, the specific motion being determined based on the resulting information including information on the action by viewing users to the video.

The generation function is such that after end of streaming of a video, a resulting screen including a character image with a specific motion applied to the character object is generated based on the information on the specific motion received by the reception function.

The display function displays the resulting screen.

Figure 37:
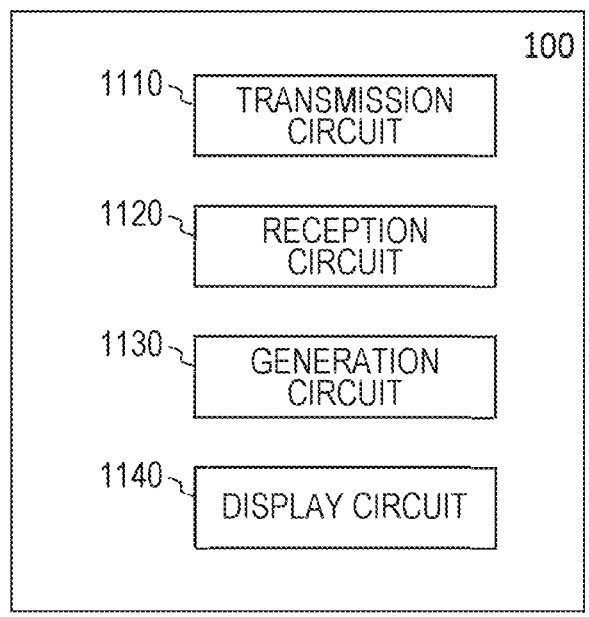
FIG. 37 is a circuit configuration diagram showing an exemplary circuit configuration for the information processing device in the present disclosure.

The above-mentioned functions can be implemented by a transmission circuit 1110, a reception circuit 1120, a generation circuit 1130 and a display circuit 1140 of information processing device 100 shown in FIG. 37. The transmission circuit 1110, the reception circuit 1120, the generation circuit 1130 and the display circuit 1140 are implemented by the above-described transmission unit 110, the reception unit 120, the generation unit 130 and the display unit 140 of information processing device 100, respectively. The details of each unit are as described above.

With the above configuration, it is possible to provide technical improvement by which at least part of the above-mentioned problem in the related art can be coped with or relieved. Specifically, it is possible to provide an information processing system capable of increasing the motivation of stream users for streaming and/or increasing the motivation of viewers for viewing.

In addition, an information processing device such as a computer or a mobile phone can be preferably used in order to function as a server device or a terminal device according to the above-described embodiment. Such an information processing device can be implemented by storing a program in a storage of the information processing device, and reading and executing the program by the CPU of the information processing device, the program describing the content of processing which implements the functions of a server device or a terminal device according to the embodiment.

Although some embodiments of the present disclosure have been described, these embodiments have been presented as examples, and it is not intended to limit the scope of the disclosure. These new embodiments can be implemented in other various modes, and various omissions, substitutions, modifications can be made in a range without departing from the gist of the disclosure. These embodiments and their modifications are included in the scope and gist of the disclosure, and included in the disclosure described in the claims and its equivalent range.

The technique described in the embodiments can be stored, as a program executable by a computing machine (computer), in a recording medium, such as a magnetic disk (such as a floppy (registered trademark) disk, a hard disk), an optical disk (such as a CD-ROM, a DVD, an MO), and a semiconductor memory (such as a ROM, a RAM, a flash memory), and can be transmitted and distributed by a communication medium. Note that the programs stored in the medium also include a setting program to configure a software unit in a computing machine, the software unit (including not only an execution program but also a table and a data structure) to be executed by the computing machine. The computing machine implementing the present device reads the program recorded in the recording medium, or in some cases, constructs a software unit by the setting program, and executes the above-described processing by controlling operations by the software unit. Note that the recording medium referred to in the present specification is not limited to the one for distribution use, and includes a storage medium, such as a magnetic disk and a semiconductor memory, provided inside the computing machine or in a device connected via a network. The storage may function as a main storage, an auxiliary storage or a cache memory, for example.

The objects to be transmitted and received, such as the above-described "gift" and the "comment" in the information processing system in the present disclosure are all electronic "data".

The communication line to implement the above-mentioned network is not limited to, but may include a mobile phone network, a wireless network (for example, Bluetooth, RF connection via WiFi (such as IEEE802.11a/b/n), WiMax, a cellular phone, a satellite, a laser, infrared rays), a fixed-line phone network, an Internet, an intranet, a local area network (LAN), a wide area network (WAN), and/or an Ethernet network.

The above-mentioned memory is not limited to, but may include a computer-readable medium such as a volatile memory (for example, a register, a cache, a random access memory (RAM)), a non-volatile memory (for example, a read only memory (ROM), an EEPROM, a flash memory), and a storage (for example, a hard disk drive (HDD), a solid state drive (SSD), a magnetic tape, an optical medium). As is easily understood, the term "computer-readable medium" is not a transmission medium such as a modulated data signal, in other words, a temporary signal, and may include a medium for data storage, such as a memory and a storage.

The present specification is described in the sense of representative various embodiments which are not intended to be limited by any method. As is used in the present application, a singular adjective, such as "one", "the above-mentioned" "said" "the" "this" "that", may include a plural adjective unless otherwise clearly stated. In addition, the term "include" may refer to "equipped with" or "provided with". In addition, the terms "coupled", "couples", "linked", "links", "connected" or "connects" include mechanical, electrical, magnetic and optical methods that couple, connect or link objects to each other along with other methods, and an intermediate element between the objects which are coupled, couple, linked, link, connected, connect in this manner is not excluded.

The various systems, methods and devices described in the present specification should not be interpreted to be limited by any method. As a practical matter, the present disclosure is directed to all new features and aspects of each of various embodiments disclosed, combinations of these various embodiments, and combinations of part of these various embodiments. The various systems, methods and devices described in the present specification are not limited to specific aspects, specific features, or combinations of these specific aspects and specific features. The objects and the methods described in the present specification do not require that one or more specific effects be obtained or a problem be solved. Furthermore, of various embodiments described in the present specification, various features or aspects, or part of the various features or aspects can be combined to be used.

Although the operations of some of various methods disclosed in the present specification are described in a specific order for convenience, it should be understood that the description in this manner allows rearrangement of the above-mentioned order of operations unless a specific order is required in a particular statement. For example, in some cases, multiple operations described in a sequential order are rearranged or performed concurrently. Furthermore, for the purpose of simplification, the accompanying drawings do not show various approaches by which various matters and methods described in the present specification can be used along with other matters and methods. In addition, in the present specification, the terms such as "generate", "produce", "display", "receive", "evaluate" and "stream" may be used. These terms are high-level description for actual various operations to be performed. Actual various operations corresponding to these terms may change depending on a specific implementation, and can be easily recognized by those skilled in the art having benefits of the disclosure of the present specification.

The theories of operation, scientific principles or other theoretical descriptions presented in the present specification in relation to the devices or the methods of the present disclosure are provided for the purpose of better understanding, and it is not intended to limit the technical scope. The devices and the methods in the accompanying claims are not limited to the devices and the methods that operate by a method described by such theories of operation.

Each of various methods disclosed in the present specification is implemented using multiple computer-executable commands stored in one or more computer-readable media (for example, one or more optical media discs, multiple volatile memory components, or a non-transitory computer-readable storage medium such as multiple non-volatile memory components), and can be performed in a computer. Here, the multiple volatile memory components include, for example, a DRAM or a SRAM. The above-mentioned multiple non-volatile memory components include, for example, a hard drive and a solid state drive (SSD). In addition, the computer includes any market available computer including, for example, a smartphone having hardware to perform calculation and other mobile devices.

Each of such multiple computer-executable commands to implement the technique disclosed in the present specification can be stored in one or more computer-readable media (for example, a non-transitory computer-readable storage medium) along with any data generated and used during implementation of various embodiments disclosed in the present specification. Such multiple computer-executable commands can be, for example, part of individual software application or part of software application accessed or downloaded via a web browser or another software application (such as remote calculation application). Such a software can be executed, for example, in a single local computer (as an agent executed in any preferred computer available in the market, for example), or in a network environment (for example, an Internet, a wide area network, a local area network, a client server network (such as a cloud calculation network), or another such network) using one or more network computers.

For clarification, only selected various specific aspects of various implementations based on software are described. Other detailed matters well known in the field are omitted. For example, the technique disclosed in the present specification is not limited to a specific computer language or program. For example, the technique disclosed in the present specification can be performed by software written by C, C++, JAVA, or any other preferred programming language. Similarly, the technique disclosed in the present specification is not limited to a specific computer or a specific type of hardware. The specific detailed matters of preferred computer and hardware are well known, and it is not necessary to describe the details in the present specification.

Furthermore, each of such various embodiments (including, for example, multiple computer-executable commands to cause a computer to perform one of various methods disclosed in the present specification) based on software can be uploaded, downloaded by a preferred communication unit, or accessed by a remote system. Such a preferred communication unit includes, for example, an Internet, a World Wide Web, an intranet, software application, a cable (including an optical fiber cable), magnetic communication, electromagnetic communication (including RF communication, microwave communication, infrared communication), electronic communication or another such communication unit.

What is claimed is:

1. An information processing device for an information processing system including a stream user terminal, a viewing user terminal and the information processing device, the information processing device comprising:
processing circuitry configured to:
stream a video, including a character object of a stream user, to the viewing user terminal by transmitting information on the video to the viewing user terminal;
aggregate resulting information including information on an action by a viewing user to the video during streaming of the video;
determine a specific motion to be applied to the character object based on the resulting information; and
transmit information on the specific motion to the stream user terminal, wherein
after the streaming of the video is ended, a resulting screen is displayed on the stream user terminal,
the resulting screen includes a character image with the specific motion applied to the character object
the character image is generated based on the information on the specific motion, and
the specific motion to be applied to the character object is posing based on pre-stored posing data.

2. The information processing device according to claim 1, wherein
the action by the viewing user includes one or more display requests for a gift, one or more posted comments, and/or one or more posted evaluations to the video by the viewing user, and
the processing circuitry aggregates a number of the one or more display requests, a number of the one or more posted comments and/or a number of the one or more posted evaluations to obtain the resulting information.

3. The information processing device according to claim 2, wherein a specific gift, selected from a gift or gifts for which the viewing user has made a display request, is displayed along with the character image on the resulting screen.

4. The information processing device according to claim 3, wherein a share icon which allows the character image to be shared by a viewing user who has made a display request for the specific gift is displayed on the resulting screen.

5. The information processing device according to claim 1, wherein
the processing circuitry is further configured to transmit the resulting information to the stream user terminal, and
the resulting information is displayed on the resulting screen.

6. The information processing device according to claim 5, wherein information on a stream time of the video, information on a score related to streaming of the video, information on a number of one or more posted evaluations to the video, information on a number of one or more posted comments to the video, information on a number of users associated with the stream user, and/or information on a number of viewers of the video are displayed on the resulting screen.

7. The information processing device according to claim 1, wherein a viewing user list, in which viewing users of the video are arranged in a predetermined order, is displayed on the resulting screen.

8. The information processing device according to claim 7, wherein
on the viewing user list, a gift image is displayed along with a number of one or more display requests for a gift, and
the gift image indicates the gift for which the viewing user has made the one or more display requests during viewing of the video.

9. The information processing device according to claim 8, wherein in a case that the viewing user has made a display request for multiple gifts each of which is the gift during viewing of the video, gift images of the multiple gifts are arranged and displayed in a specific order.

10. The information processing device according to claim 1, wherein a share icon which allows the character image to be shared by the viewing user or other users is displayed on the resulting screen.

11. The information processing device according to claim 1, wherein
the resulting information further includes information on an action by the stream user to the video during streaming of the video, and
the processing circuitry is configured to determine the specific motion to be applied to the character object based on the resulting information including the information on the action by the viewing user to the video and the information on the action by the stream user to the video.

12. The information processing device according to claim 11, wherein
the action by the stream user is the streaming of the video by the stream user, and
the processing circuitry is configured to aggregate a stream time of the video provided by the stream user, and include the aggregated stream time in the resulting information.

13. The information processing device according to claim 1, wherein the processing circuitry is configured to aggregate the resulting information in response to a stream end request transmitted from the stream user terminal.

14. The information processing device according to claim 1, wherein the processing circuitry is configured to determine a motion, associated with a classification corresponding to resulting information, as a specific motion to be applied to the character object of the stream user.

15. The information processing device according to claim 1, wherein the character object to which the specific motion is applied is a character object in a display mode included in the video immediately before a stream end request is transmitted from the stream user terminal.

16. The information processing device according to claim 15, wherein a confirmation screen regarding the display mode of the character object is displayed on the stream user terminal before a stream end request for the video is transmitted.

17. An information processing method, comprising:
streaming a video, including a character object of a stream user, to a viewing user terminal by transmitting information on the video to the viewing user terminal;
aggregating resulting information including information on an action by a viewing user to the video during the streaming of the video;
determining a specific motion to be applied to the character object based on the resulting information; and
transmitting information on the specific motion to a stream user terminal,
wherein
after the streaming of the video is ended, a resulting screen is displayed on the stream user terminal,
the resulting screen includes a character image with the specific motion applied to the character object, and
the character image is generated based on the information on the specific motion, and
the specific motion to be applied to the character object is posing based on pre-stored posing data.

18. The information processing method according to claim 17, wherein
the action by the viewing user includes one or more display requests for a gift, one or more posted comments, and/or one or more posted evaluations to the video by the viewing user, and
the aggregating includes aggregating a number of the one or more display requests, a number of the one or more posted comments and/or a number of the one or more posted evaluations to obtain the resulting information.

19. The information processing method according to claim 17, further comprising:
transmitting the resulting information to the stream user terminal, wherein
the resulting information is displayed on the resulting screen.

20. A non-transitory computer readable medium storing computer executable instructions which, when executed by a processor, cause the processor to:
stream a video, including a character object of a stream user, to a viewing user terminal by transmitting information on the video to the viewing user terminal;
aggregate resulting information including information on an action by a viewing user to the video during the streaming of the video;
determine a specific motion to be applied to the character object based on the resulting information; and
transmit information on the specific motion to a stream user terminal, wherein
after streaming of the video is ended, a resulting screen is displayed on the stream user terminal,
the resulting screen includes a character image with the specific motion applied to the character object, and
the character image is generated based on the information on the specific motion, and
the specific motion to be applied to the character object is posing based on pre-stored posing data.

* * * * *